(12) United States Patent
Lorenzen et al.

(10) Patent No.: US 7,197,475 B1
(45) Date of Patent: Mar. 27, 2007

(54) MULTI-VENDOR INTERNET COMMERCE SYSTEM FOR E-COMMERCE APPLICATIONS AND METHODS THEREFOR

(75) Inventors: Lee Jay Lorenzen, Pacific Grove, CA (US); Jordan Zimmerman, Monterey, CA (US)

(73) Assignee: Catalog City, Inc., Pacific Grove, CA (US)

( * ) Notice: Subject to any disclaimer, the term of this patent is extended or adjusted under 35 U.S.C. 154(b) by 175 days.

(21) Appl. No.: 09/594,213

(22) Filed: Jun. 14, 2000

Related U.S. Application Data

(60) Provisional application No. 60/141,898, filed on Jun. 30, 1999.

(51) Int. Cl.
*G06Q 30/00* (2006.01)
(52) U.S. Cl. .................... 705/26; 705/34; 235/383
(58) Field of Classification Search ............... 705/26, 705/27, 30, 24, 34; 709/200, 223, 213, 249; 707/1; 235/383
See application file for complete search history.

(56) References Cited

U.S. PATENT DOCUMENTS

| | | | |
|---|---|---|---|
| 4,799,156 A * | 1/1989 | Shavit et al. ................ 705/26 |
| 5,319,542 A | 6/1994 | King, Jr. et al. ............ 364/401 |
| 5,592,375 A | 1/1997 | Salmon et al. ............. 395/207 |
| 5,671,279 A | 9/1997 | Elgamal ....................... 380/23 |
| 5,710,887 A | 1/1998 | Chelliah et al. ............ 395/226 |
| 5,715,314 A | 2/1998 | Payne et al. .................. 380/24 |
| 5,727,048 A | 3/1998 | Hiroshima et al. ...... 379/93.12 |
| 5,742,768 A | 4/1998 | Gennaro et al. ........ 295/200.33 |
| 5,758,328 A | 5/1998 | Giovannoli .................. 705/26 |
| 5,774,874 A * | 6/1998 | Veeneman et al. ............ 705/27 |
| 5,790,677 A | 8/1998 | Fox et al. ..................... 380/24 |
| 5,794,207 A | 8/1998 | Walker et al. ................ 705/23 |
| 5,895,454 A | 4/1999 | Harrington .................... 705/26 |
| 5,897,621 A | 4/1999 | Boesch et al. ................ 705/26 |
| 5,897,622 A | 4/1999 | Blinn et al. .................... 705/26 |
| 5,918,213 A | 6/1999 | Bernard et al. ............... 705/26 |
| 5,946,665 A | 8/1999 | Suzuki et al. ................. 705/26 |
| 5,970,471 A | 10/1999 | Hill .............................. 705/26 |
| 6,006,200 A | 12/1999 | Boies et al. ................... 705/26 |

(Continued)

FOREIGN PATENT DOCUMENTS

EP        1150227 A1        10/2001

(Continued)

OTHER PUBLICATIONS www.amazon.com.*

(Continued)

*Primary Examiner*—F. Zeender
(74) *Attorney, Agent, or Firm*—Carr & Ferrell LLP

(57) ABSTRACT

The present invention relates to a multi-vendor Internet Commerce System for e-commerce applications. More particularly, the present invention relates to an improved architecture for enabling e-commerce in an efficient and consumer-friendly way for a plurality of vendors through the Internet. A multi-vendor Internet commerce system (MV-ICS) is provided which includes a centrally implemented multi-vendor central processing unit (MV-CPU) acting cooperatively with a centrally implemented multi-vendor shared datastore (MV-SD). Using a variety of vendor-site I/O modules and consumer-interface I/O modules, the resources with the MV-SD may be shared by the plurality of vendor websites. This serves to relieve the individual vendor websites from having to set up and maintain some or all of certain facilities (i.e., programs and capabilities, including merchant database, consumer database, shopping cart facility, checkout facility, and the like). Various logic associated with the MV-CPU ensures that the appropriate communication occurs between each vendor website and the MV-SD, as well as the consumer via a browser.

1 Claim, 18 Drawing Sheets

U.S. PATENT DOCUMENTS

| | | | |
|---|---|---|---|
| 6,016,504 A | 1/2000 | Arnold et al. | 709/200 |
| 6,029,141 A * | 2/2000 | Bezos et al. | 705/27 |
| 6,032,129 A | 2/2000 | Greef et al. | 705/27 |
| 6,032,145 A | 2/2000 | Beall et al. | 707/5 |
| 6,052,710 A | 4/2000 | Saliba et al. | 709/203 |
| 6,101,482 A * | 8/2000 | DiAngelo et al. | 705/26 |
| 6,101,485 A | 8/2000 | Fortenberry et al. | 705/27 |
| 6,119,101 A | 9/2000 | Peckover | 705/26 |
| 6,125,352 A | 9/2000 | Franklin et al. | 705/26 |
| 6,128,600 A | 10/2000 | Imamura et al. | 705/27 |
| 6,133,912 A | 10/2000 | Montero | 345/327 |
| 6,185,541 B1 | 2/2001 | Scroggie et al. | 705/14 |
| 6,219,680 B1 | 4/2001 | Bernardo et al. | 707/501 |
| 6,269,343 B1 | 7/2001 | Pallakoff | 705/26 |
| 6,282,517 B1 | 8/2001 | Wolfe et al. | 705/26 |
| 6,292,786 B1 | 9/2001 | Deaton et al. | 705/14 |
| 6,298,330 B1 | 10/2001 | Gardenswartz et al. | 705/14 |
| 6,321,211 B1 | 11/2001 | Dodd | 705/26 |
| 6,336,100 B1 | 1/2002 | Yamada | 705/26 |
| 6,343,274 B1 | 1/2002 | McCollom et al. | 705/26 |
| 6,460,020 B1 | 10/2002 | Pool et al. | 705/26 |
| 6,460,072 B1 | 10/2002 | Arnold et al. | 709/203 |
| 6,466,970 B1 | 10/2002 | Lee et al. | 709/217 |
| 6,490,567 B1 | 12/2002 | Gregory | 705/39 |
| 6,526,443 B1 | 2/2003 | Goldsmith et al. | 709/224 |
| 6,574,607 B1 | 6/2003 | Carter et al. | 705/26 |
| 2001/0011250 A1 | 8/2001 | Paltenghe et al. | 705/41 |
| 2002/0002513 A1 | 1/2002 | Chiasson | 705/27 |
| 2002/0038255 A1 | 3/2002 | Tarvydas | 705/26 |
| 2002/0055888 A1* | 5/2002 | Beran et al. | 705/26 |
| 2002/0087430 A1 | 7/2002 | Davis et al. | 705/26 |

FOREIGN PATENT DOCUMENTS

| | | |
|---|---|---|
| WO | 90/11587 | 4/1990 |

OTHER PUBLICATIONS

U.S. Appl. No. 09/451,469, filed Nov. 30, 1999, Inventors: Lee Jay Lorenzen and Jordan Zimmerman.

Guilford, Roxanna. Transportation Tips for No-Problem, Timely Deliveries. Apparel Industry Magazine. Oct. 1998. vol. 59, No. 10, pp. SS38, SS42+.

Gurume, Toa. Life with Internet(4). Internet Magazine No. 4, Impress Corporation, Japan, Apr. 18, 1995, p. 118.

International Search Report, Aug. 29, 2001 (date mailed), International Application No. PCT/US01/13622, 4 pages.

Loizos, *ERP: Is It the Ultimate Software Solution?*, Industry Week (1998), V. 247, N. 16, p. 33(1).

*Corrections and Amplifications,* P.C. Magazine (1998), V. 17, N. 3, p. 24.

Shimbun, *Daily Yomiuri,* Business Update (2000).

*NOVA Teams with Prio to Offer Merchants Online Affinity Program,* Phillips business Information (1999), vol. 14, Issue 17.

Trans-Express International Courier Systems, MasterDelivery User's Manual.

SkyBox Services Corporation's web site archived on Dec. 6, 1998 (http://web.archive.org/web/19981206060158/http://www.skybox.net).

Ostrowski, Jeff. "Miami Firm Caters to Latin Shopaholics" South Florida Business Journal, vol. 19, No. 2, p. C8, Aug. 28, 1998.

Paul Bandrowski, Stores without Doors: Kiosks Generate New Profits, Corporate Computing, vol. 1, No. 4, Oct. 1992.

Robert B. Doorenbos, et al., "A Scalable Comparison-Shopping Agent for the World-Wide Web", Department of Computer Science and Engineering, University of Washington, Proceedings of the First International Conference on Autonomous Agents, Feb. 5-8, 1997.

Arthur M. Keller, et al., "Multivendor Catalogs: Smart Catalogs and Virtual Catalogs", Stanford University Computer Science Department, 1996.

Arun Iyengar, et al., "Research Report: Distributed Virtual Malls on the World Wide Web", IBM Research Division, T.J. Watson Research Center, Sep. 4, 1997.

Business Wire, "Viaweb Lets Users Create own Web Storefront in Minutes; Anyone Can Create a Site with Secure Online Ordering", Business Wire, Inc., Feb. 13, 1996.

Information Week, "Microsoft Plans Online Shopping System—Merchant Server and Tools Will Strive for Common Standards," CMP Media Inc., Feb. 19, 1996.

Mitch Wagner, et al., "Start-up Pitches On-line Catalogs for Dummies," Computerworld Inc., Feb. 19, 1996.

Homepage of www.ishops.com, retrieved from (http://web.archive.org/web/19961107112121/http://www.ishops.com).

Tim Jackson, "Media Futures: This bazaar could put retailers under the hammer," Financial Times of London, The Financial Times Limited, May 29, 1995.

Ken Siegmann, "Nowhere to Go but Up; Onsale CEO Jerry Kaplan," PC Week Inside, No. 42, vol. 12, Oct. 23, 1995.

Bruce Fox, "Retailing on the Internet: Seeking truth beyond the hype," Chain Storage Age, Sep. 1995.

MCI Communications Corp., "Opening for Business," Data Communications, Feb. 1995.

IRA Sager, "The New I-Way Hog: IBM", Business Week, Sep. 16, 1996.

Jeff Ubois, "Shop 'til Your Modem Drops," Internet World, Jun. 1995.

Cynthia N. James-Catalano, "Hit the Malls," Internet World, Dec. 1996.

Web pages from the website choicemall.com, obtained from (http://web.archive.org/web/19961222083932/http://choicemall.com) (http://web.archive.org/web/19970413024950/choicemall.com/about.html).

PC Week Executive Staff, "PC Week's Top 10 E-commerce sites", PCWeek Online, Jan. 6, 1997.

Richard Tedesco, "Microsoft, IBM Hope to Cash in on the Internet", Broadcasting and Cable, Telemedia Week, vol. 126, No. 26, p. 64, Jun. 17, 1996.

R. G., "MCI Meets the Home-Shopping Network", Data Communications, p. 49, Nov. 21, 1995.

Karen Rodriguez, "MCI Rolls Out Internet Electronic Commerce", Infoworld, p. 12, Apr. 3, 1995.

Ellis Booker, "MCI Opens Doors to King of Cybermalls", Computerworld, Apr. 10, 1995.

* cited by examiner myStores
Buy/Gift Buttons For: Altura Software myBuy URL:

```
http://www.catalogcity.com/external/addprod.cfm?
ccpid=754369&cmd=s&rtn=http%3A%2F%2Fwww%2Eamazon%2Ecom%
2Fexec%2Fobidos%2FASIN%2F0451191145%2Fo%2Fqid%3D930776352%
2Fsr%3D2%2D1%2F002%2D0234999%
2D7522204&sku=24372&qty=1&name=Ayn%20Rand%3A%20Atlas%
20Shrugged&price=7.19&ccsvn=11114
```
— 700

FIG. 7A

Click here to try myBuy myGift URL:

```
http://www.catalogcity.com/external/addprod.cfm?
ccpid=754369&cmd=g&rtn=http%3A%2F%2Fwww%2Eamazon%2Ecom%
2Fexec%2Fobidos%2FASIN%2F0451191145%2Fo%2Fqid%3D930776352%
2Fsr%3D2%2D1%2F002%2D0234999%
2D7522204&sku=24372&qty=1&name=Ayn%20Rand%3A%20Atlas%
20Shrugged&price=7.19&ccsvn=11114
```

FIG. 7B

Click here to try myGift!

To create a sample Buy or Gift button, enter typical values for one of the products you wish to sell in your store and then click the "Get HTML" button.

Item Code: 24372 — 802
Item Name: Ayn Rand: Atlas Shrugged — 804
Price: $ 7.19 — 806
Return URL: http://www.amazon.com/exec/obidos/ASIN — 808

[ GET HTML ]  [ CLEAR ]

©1999 Catalog City, Inc.

| Books | Music | Video | Gifts | 🛒 HELP |
|---|---|---|---|---|
| | | | | YOUR ACCOUNT |

| Book Search | Browse Subjects | Bestsellers | Featured in the media | Award Winners | Computers & Internet | Kids | Recommendation Center |

Text Only

Atlas Shrugged — 1002 by <u>Ayn Rand</u>, <u>Leonard Peikoff</u> (Designer)

Book Information
↓
at a glance reviews customer comments if you like this book...

Keyword Search

[ Books ▼ ]

[        ]

[ Go ]

Full search: <u>Books</u>, <u>Music</u> or <u>Video</u>

BOOK

List Price: ~~$39.95~~
Our Price: $27.97
You Save: $11.98 (30%)

Availability: This title usually ships within 24 hours.
Holiday Note: Use any shipping method for delivery by Dec. 24. (US customers)

Hardcover - 1168 pages 35th anniv edition (March 1992)
E P Dutton; ISBN: 0525934189 ; Dimensions (in inches): 2.25 x 9.33 x 6.41
Amazon.com Sales Rank: 888
Avg. Customer Review: ★★★★★
Number of Reviews: 326

[ Add to Shopping Cart ]
(You can always remove it later)

[ My Gift ] — 1004

[ My Buy ] — 1006

<u>Write an online review</u> and share your thoughts with other readers!

Customers who bought this book also bought:

- <u>The Fountainhead</u>; Ayn Rand
- <u>Anthem</u>; Ayn Rand
- <u>Virtue of Selfishness : A New Concept of Egoism</u>; Ayn Rand

Click here for more suggestions...

FIG. 10

Reviews

<u>The Merriam-Webster Encyclopedia of Literature</u>, April 1, 1995
Novel by Ayn Rand, published in 1957. The book's female protagonist, Dagny Taggart, struggles to manage a transcontinental railroad amid the pressures and restrictions of massive bureaucracy. Her antagonistic reaction to a libertarian group seeking an end to government regulation is later echoed and modified in her encounter with a utopian community, Galt's Gulch, whose members regard self-determination rather than collective responsibility as the highest ideal. The novel contains the most complete presentation of Rand's personal philosophy, known as objectivism, in fictional form.

Synopsis
"Who is John Galt?" is the immortal question posed at the beginning of Rand's masterpiece that is as passionate as it is profound. The answer is the astonishing story of a man who said he would stop the motor of the world--and did. 6 cassettes. --*This text refers to the <u>audio cassette edition</u> of this title*

Synopsis
Tremendous in scope, breathtaking in its suspense, Atlas Shrugged is Ayn Rand's magnum opus, a premier moral apologia for capitalism--a defense that had an electrifying effect on millions of readers (and now listeners) who have never POST DIGITAL                                    myStore

| Drives<br>Zip Drives<br>Jazz Drives | 250MB External SCSI Zip Drive<br><br>Introducing the new 250MB Zip drive - now you can back-up even more of your important files. The 250MB Zip drives are the same reliable, easy-to-use solution you are used to, and what's more, they are compatible with 100MB Zip disks, too! Add the 250MB External Zip drive to your cart, now.<br><br>Item #10201          $259.95 | [drive image]<br><br>add to cart ▶ 🛒<br>gift registry ▶ 🎁 |
| Media<br>Zip Media<br>Jazz Media | | |
| [Home] | 100MB External SCSI Zip Drive<br><br>The 100MB External SCSI Zip drive for Macs and PCs is an affordable storage solution that is compact, light and portable and lets you expand your hard drive without limits and hold the stuff you need for work or play.<br><br>Item: #10202          $99.95 | [drive image]<br><br>add to cart ▶ 🛒<br>gift registry ▶ 🎁 |
| | 100MB External Parallel Port Zip Drive for PCs<br><br>Take advantage of your PC's easy-to-use parallel port to start enjoying the convenience of a 100MB External Zip drive right now.<br><br>Item: #10203          $99.95 | [drive image]<br><br>add to cart ▶ 🛒<br>gift registry ▶ 🎁 |

FIG. 12

| Home | Catalogs | Search | My Account | Shopping Cart | Gift Center | Help |

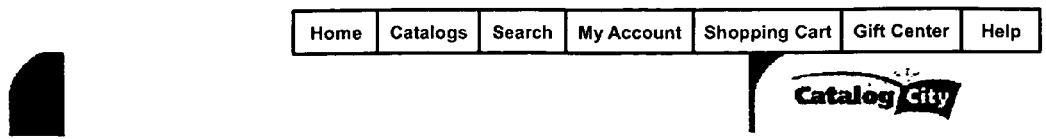

Gift registry

Here's where you can register for gifts for any occasion, check out your friends' registries and browse other folks' registries for gift ideas. We'll ask you some information to identify you and the occasion. Then you can browse our online catalogs for everything you want to register for. You can select standard registry forms or you can customize your registry.

View my Catalog City registry
Edit this registry's information
Find someone else's Catalog City registry
Create a new registry

My Registry

| Item Name | Item # | Catalog | Qty Requested | Qty Received | Unit Price | Options |
|---|---|---|---|---|---|---|
| Ayn Rand: Atlas Shrugged | 24372 | Home Marketplace, Spring 1999 | 1 | 0 | $27.97 | Change Remove |
| Murano Vase | A9456A | GoodCatalog.com, A Reader's Digest Company | 1 | 0 | $129.00 | Change Remove |
| Murano Vase | A9456A | GoodCatalog.com, A Reader's Digest Company | 1 | 0 | $129.00 | Change Remove |

Home | Catalogs | Search | My account | Shopping cart | Gift center | Help

Remind me™ shopping planner | My favorites

© 1998-1999 Catalog City, Inc.   Legal Info   (c001)

http://www.catalogcity.com

Thousands of Catalogs
One Sign-Up
One Shopping Cart

| Home | Catalogs | Search | My Account | Shopping Cart | Gift Center | Help |

CatalogCity

Keyword Search

[    ]

- Search for products
- Search for a catalog name

[Search]

Catalogs

A-Z index of catalogs
Clothing
Computers and Electronics
Travel
Books, Music and Video
Food and Drink
Gardening
Gifts and Collectibles
Health and Fitness
Hobbies and Crafts
At Home
Home Office
Cars and Trucks
Jewelry and Accessories
Kids' Place
Pets
Lifestyles
Sports
Business to Business

Shop Online

[Gift Registry ▼]

[Go]

Comments or Suggestions?
e-mail us at
customerservice@catalogcity.com

About Catalog City
Safe Shopping Guarantee

Welcome back, Jordan Zimmerman
If you're not Jordan Zimmerman, click here.
Find some great things to wear for spring and summer.

What's New at Catalog City? The Sharper Image!

Gift Shopping
Click to select special gifts in any price range.

Cotton Denim Shortalls
$32.00 - $34.00

Our Top Catalog Brands   To see a catalog, click on a cover.

Linen Source
Inspired collections of high fashion and traditional bedding.

Royal American Links - TOSKI GOLF Products
Four, everybody!

TravelSmith Outfitting Guide and Catalog
A must for travel&151;even if your travel is only the commute

Neiman Marcus by Mail - Essentials
Casual.... the way you just casually become the center of attention wearing these.

Got a coupon? Click here

The Video Collection

Where have you gone Joe Dimaggio?
[Details]

Product Story

Sports and sporting merchandise

Hey, batter, batter, batter!

What is it about this time of year? The crack of the ball against the bat? The cries of "Pe-e-e-anuts! Pe-e-e-eanuts!" from the vendor? Multimillion-dollar salaries? Or is it the nonstop beer commercials? It's baseball season, and Catalog City

FIG. 15 http://www.catalogcity.com/home.cfm                                    6/29/99

| Home | Catalogs | Search | My Account | Shopping Cart | Gift Center | Help |

Catalog City

Shopping cart

Thank you for shopping at CC Live!

| Item Name | Item # | Catalog | Qty | Unit Price | Order Price | Options |
|---|---|---|---|---|---|---|
| Ayn Rand: Atlas Shrugged | 24372 | Amazon.com, Amazon.com Mystores Demo | 1 | $27.97 | $27.97 | Change Remove |

Subtotal: $27.97

[Continue Shopping]   [Checkout (secure)]

If you experience problems using Checkout (secure), click here to Checkout using our standard server instead.

Home | Catalogs | Search | My account | Shopping cart | Gift center | Help

Remind me™ shopping planner | My favorites

© 1998-1999 Catalog City, Inc.   Legal Info   (c001)

http://205.231.211.15

FIG. 16 http://205.231.211.15/viewcart.cfm?x=0&ccsyn=200         6/29/99 myStores

Welcome to myStores where you can create your own store in minutes!

- Become a Catalog City Network Merchant Member *right now* in just a few minutes

At myStores, if you have your own website, you can use myStores as your e-commerce shopping cart, gift registry and more.

Here are a recent members of the Catalog City Network of cooperating merchants:

Altura.com
    GoodCatalog

Here are a few examples of possible future Catalog City Network Merchant Members:

Amazon.com (simulated)
    CDNow (simulated)
    Amazon.com (live)
    CDNow (live)
    Harry and David

- Edit a store you've already created

- Popup Product Demo

http://dev.catalogcity.com/mystores/editor/entrance.cfm     6/29/99

FIG. 17

MULTI-VENDOR INTERNET COMMERCE SYSTEM FOR E-COMMERCE APPLICATIONS AND METHODS THEREFOR

BACKGROUND OF THE INVENTION

The following applications are related to the present disclosure and are incorporated by reference herein: a Provisional Application entitled "Method and Apparatus for E-Commerce Enabling an Object" by the same inventors, filed in the U.S. Patent and Trademark Office (USPTO) on Jun. 30, 1999, and assigned Ser. No. 60/141,898; the utility application resulting therefrom (having the same title), filed in the USPTO on Nov. 30, 1999, and assigned Ser. No. 09/451,469 now abandoned.

The present invention relates to a multi-vendor Internet Commerce System for e-commerce application. More particularly, the present invention relates to an improved architecture for enabling e-commerce in an efficient and consumer-friendly way for a plurality of vendors through the Internet.

Electronic commerce, or e-commerce, represents a highly convenient and efficient way for buyers and sellers to conduct transactions worldwide and at all times. In the current paradigm, the vendor having merchandise to offer typically implements a website at a vendor server, which may be maintained by the vendor's staff or hosted at a hosting facility. The vendor website typically includes a product database, representing the database of products to be sold, and a consumer database, representing the database of the vendor's customers and their profiles. To facilitate the transaction process, a variety of search, shopping cart, and checkout tools may be provided. In general, these tools facilitate the interaction between a specific vendor website and the consumer. On the consumer's side, the interaction typically takes place through an appropriate user interface at the client's terminal. In the current paradigm, one such user interface may represent a commercially available web browser such as Internet Explorer by Microsoft Corporation of Redmond, Wash. or Netscape by America Online of Vienna, Va.

To facilitate discussion, FIG. 1 illustrates a simplified representation of a prior art e-commerce arrangement 100 between a consumer 102 and a vendor 103. To facilitate their electronic commerce activities, the interaction between consumer 102 and vendor 103 is facilitated through a terminal 104 and vendor website 108. As shown, both vendor website 108 and terminal 104 are connected to the Internet 106. To conduct an e-commerce transaction with vendor 103 via the Internet 106, consumer 102 typically utilizes a commercially available browser at terminal 104. By way of example, consumer 102 may enter the URL (Universal Resource Locator) for the vendor website into a browser 110 in order to access the vendor website. In the example of FIG. 1, the URL may be, for example, http://www.agoodwebstore.com.

The transmission of the URL from browser 110 to vendor website 108 is represented symbolically by path 112. Responsive to the receipt of the URL, vendor website 108 may return, over time, a plurality of pages to browser 110 on terminal 104 to permit consumer 102 to sign in, conduct searches among the items of merchandise offered for sale, and to make a selection. The transmission of a page containing one or more products for sale is represented symbolically in FIG. 1 by path 114.

At some point, consumer 102 may wish to select an item for purchase. In the example of FIG. 1, the selection of an item for purchase occurs when consumer 102 clicks on a shopping cart button 116, which causes a message that includes the description of the selected item to be transmitted to an electronic shopping cart associated with vendor 103 and to be added thereto. Generally, the electronic shopping cart resides at client browser 110 and contains items offered for sale by vendor 103. With reference to FIG. 1, the transmission of the description of the selected item is accomplished via a path 120. Once the selected item is added to the shopping cart associated with vendor 103, the process may proceed with consumer 102 continuing to search for and select additional items to be added to the shopping cart.

If consumer 102 elects to checkout, consumer 102 may click on a "buy" button 126 on browser 110, which sends a checkout instruction via a path 128 from browser 110 to vendor website 108, as well as the items in the shopping cart stored locally at the client browser 110. At vendor website 108, the receipt of the checkout instruction may cause an invoice to be prepared using the list of items selected (which is stored in the shopping cart at vendor website 108). Taxes, handling and shipping charges, as well as any other discounts or markups may be calculated at this point, and the final invoice may be presented to consumer 102 via path 130 as an invoice page on browser 110. Unless consumer 102 is already a customer with vendor website 108, the payment page may also include a form to permit consumer 102 to fill out any necessary personal, payment, and shipping data. Exemplary data that may be required includes name, address, credit card number, ship address, ship method preferred, and the like. Consumer 102 may fill out the payment data form and transmit the completed form back to vendor website 108 via path 132 to permit vendor 103 to, for example, charge the credit card indicated for the items purchased and to ship to the address specified.

Although the prior art e-commerce paradigm allows consumer 102 to shop for merchandise, select merchandise for payment, and complete the transaction at each vendor website in a fairly efficient manner, there are disadvantages. By way of example, since the process of entering the personal, payment, and shipping data is rather laborious, some vendors retain such confidential information at the vendor website to permit the vendor to furnish such information automatically the next time the same consumer purchases from that vendor's website again. In this case, the consumer is given a consumer ID and a password for authentication purposes on subsequent visits to the website.

As can be appreciated by those skilled in the art, however, the fact that confidential personal, payment, and shipping data pertaining to the consumers are kept at the vendor poses a security risk. The security risk is increased if the consumer purchases from multiple Internet vendors and may have his or her confidential data kept at multiple websites throughout the Internet.

Even if the security risk can be eliminated, the fact that each vendor website may issue a different set of consumer ID and password represents an inconvenience to the consumer. Although a consumer generally tries to keep the same consumer ID and password across multiple vendor websites, there may be times when, at a particular vendor website, the desired consumer ID and/or password is not available, and the consumer is then forced to choose another set of consumer ID/password. Over time, the average consumer may be burdened with having to memorize numerous sets of consumer ID/password and the websites that are applicable thereto.

As mentioned before, the consumer has the option to place items into an electronic shopping cart prior to checking out. This paradigm allows the consumer to conveniently tally his or her intended purchases prior to paying for them. Over time, consumers have come to rely on this shopping cart paradigm and rely on the shopping cart. However, since the shopping cart of the prior art typically works only with the website that issues it, a consumer shopping at multiple websites may have multiple shopping carts with items therein pending and waiting to be checked out. Since each shopping cart contains only items from a single vendor, the consumer must contend with multiple shopping carts and juggle among them to keep track of items selected. This makes it difficult for the average consumer to, for example, quickly determine whether the total cost for the items selected across multiple vendors fits within the consumer's budget, or to quickly compare an item already placed in the shopping cart at one vendor website with another item that the consumer may be considering from another vendor website.

Another disadvantage relates to the fact that the shopping cart of the prior art resides at the client browser (e.g., 110 of FIG. 1). If the consumer uses one terminal/browser to shop and place items into the prior art shopping cart but has not checked out and subsequently moves to another terminal to continue shopping, the consumer will be presented with another shopping cart, which does not have therein the items already picked and placed into the original shopping cart. This is so even though the consumer has been shopping with the same vendor all along. As can be appreciated by those skilled in the art, this is inefficient and creates confusion for the consumer.

Still further, the fact that each vendor website currently maintains its own consumer database and/or implements its own shopper authentication/ID mechanism, its own shopping cart infrastructure, and/or its web-based checkout infrastructure represents a significant barrier to entry into e-commerce for many vendors who have yet to implement their e-commerce website. This is because these infrastructures require a significant investment of time and effort to set up and maintain. Furthermore, since these infrastructures are set up and maintained at each website, the duplication in effort represents collectively a wasteful use of time and money for e-commerce vendors as a group.

Additionally, the fact that each vendor website implements its own shopping cart and checkout facilities, the user interface of the shopping cart and/or the checkout page as well as the navigation steps involved therewith may vary widely from vendor site to vendor site. From the consumer's perspective, the effort required to learn different websites and become familiarized with their shopping carts and checkout procedures may discourage some consumers from fully utilizing the rich offerings of products and services on the Internet.

In view of the foregoing, there are desired improved architectures and techniques therefor which enable e-commerce in an efficient and consumer-friendly way for a plurality of vendor websites through the Internet.

BRIEF DESCRIPTION OF THE DRAWINGS

FIG. 7 illustrates a representative HTML snippet encoded in an exemplary vendor page to facilitate a purchase.

FIG. 8 illustrates a representative merchant input form used to create the snippet.

FIG. 10 illustrates an exemplary product page.

FIG. 12 illustrates an exemplary web page for a vendor who has no desire to develop a catalog.

FIG. 14 illustrates an exemplary gift registry.

FIG. 15 illustrates an exemplary web page presented by the Multi-Vendor Central System.

FIG. 16. illustrates an exemplary shopping cart web page associated with a vendor type X.

FIG. 17 illustrates an exemplary merchant input.

FIGS. A1–A46 and B1–B14 are screenshots of some exemplary implementations of an inventive Multi-Vendor Internet Commerce System.

DETAILED DESCRIPTION OF THE PREFERRED EMBODIMENTS

In accordance with one embodiment of the present invention, there is provided a multi-vendor Internet Commerce System which advantageously offers both consumer user-friendliness and ease of setup and maintenance for a plurality of e-commerce vendors. With respect to ease of set up and maintenance, there is provided, in accordance with one aspect of the present invention, a Multi-Vendor Internet Commerce System (MV-ICS) 202, which includes a centrally implemented Multi-Vendor Central Processing Unit (Multi-Vendor CPU) 210 acting cooperatively with a centrally implemented Multi-Vendor Shared Datastores (MV-SD) 212. Using a variety of vendor-site I/O modules 220 and consumer-interface I/O modules 216, the resources within the Multi-Vendor Shared Datastores (MV-SD) 212 may be shared by the plurality of vendor websites to relieve the individual vendor websites of the burden of setting up and maintaining some or all of the facilities of the Multi-Vendor Shared Datastores (MV-SD) 212 (such as the consumer database, the shopping cart facility, the checkout facility, and the like). However, logic in the Multi-Vendor Central processing unit (Multi-Vendor CPU) 210 of the Multi-Vendor Internet Commerce System (MV-ICS) 202 ensures that appropriate communication occurs between each vendor website and the Multi-Vendor Shared Datastores (MV-SD) 212 as well as the consumer via his or her browser.

From the perspective of the individual vendor website, the fact that the Multi-Vendor Shared Datastores (MV-SD) 212 is shared among many different vendor websites is substantially transparent, except for the additional benefits that are derived from sharing resources, as will be described hereinafter. Likewise, from the perspective of the consumer employing the Multi-Vendor Internet Commerce System (MV-ICS) 202 to make his or her selection and purchase, it is substantially transparent that the facilities that implement the shopping cart, the checkout procedure, as well as other shared resources (such as the gift registry or the sign-in procedure) are no longer implemented at individual vendor websites. As will be discussed later herein, the sharing of these resources also offer additional benefits and features to the consumers, which have been unavailable in the prior art paradigm.

Figure 2:
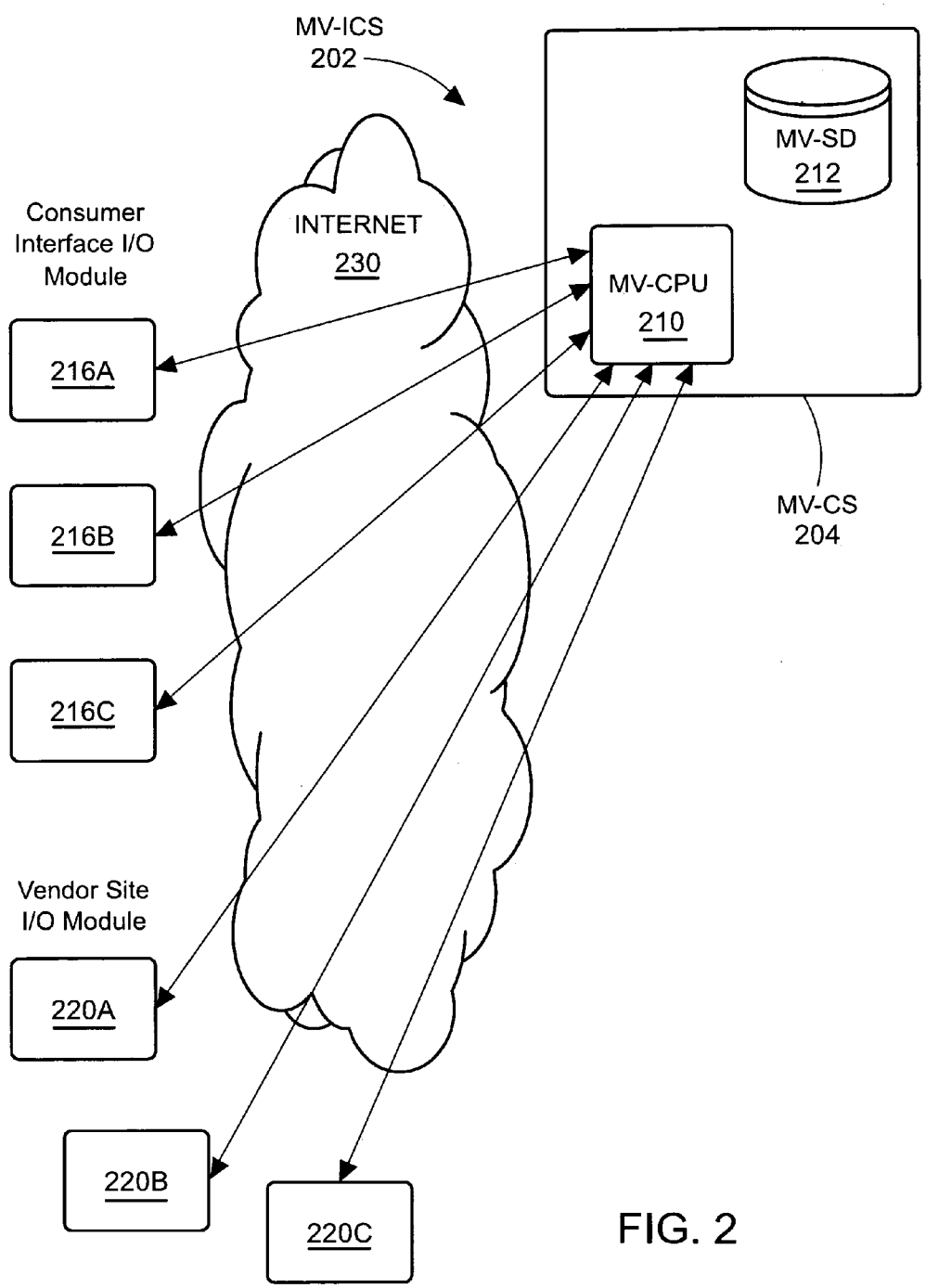
FIG. 2 illustrates a multi-vendor Internet commerce system.

To facilitate discussion, FIG. 2 illustrates, in accordance with one aspect of the present invention, a Multi-Vendor Internet Commerce System (MV-ICS) 202, which includes the Multi-Vendor Central System (MV-CS) 204. MV-CS 204 represents the centrally implemented logic and data resources that may be shared by the plurality of vendor websites. Multi-Vendor Central System (MV-CS) 204 may also be utilized by the consumer terminal to conduct e-commerce transactions with the individual vendor websites vis-a-vis Multi-Vendor Internet Commerce System (MV-ICS) 202. As shown in FIG. 2, Multi-Vendor Internet Commerce System (MV-ICS) 202 includes a Multi-Vendor Central Processing Unit (Multi-Vendor CPU) 210 in communication with a Multi-Vendor Shared Datastores (MV-SD) 212. In general, Multi-Vendor CPU 210 and MV-SD 212 may be located at the same central location but they may also be dispersed among multiple sites that are interconnected through some network connection or through the Internet. Logically, however, they represent centrally implemented entities that are shared by the vendor websites and the consumer terminals and facilitate e-commerce therebetween.

The Multi-Vendor Shared Datastores (MV-SD) 212 includes at least a consumer database, which tracks consumer profiles (i.e., shopper profiles) on behalf of the plurality of participating vendor websites. The information tracked by the consumer data base for each consumer may include, for example, the consumer personal information such as name, home address, phone number, payment method, and payment information (such as credit card information or deposit account information), as well as a unique shopper ID for uniquely identifying a consumer. The consumer profile for each consumer may also include a universal, cross-vendor shopping cart into which items selected from a plurality of vendors may be deposited. The consumer profile may also include other tools, registries, and lists such as the universal, cross-vendor gift registry, the universal, cross-vendor remind-me registry, and the like. These registries are discussed in detail later herein. For convenience, an address book having therein address information for shipping purposes may also be included.

The Multi-Vendor Shared Datastores (MV-SD) 212 may also include a vendor database, which tracks the participating vendor profiles and their websites. The vendor database may include the identity of the vendors who participate in the Multi-Vendor Internet Commerce System (MV-ICS) 202. Each vendor profile may also include additional information such as the vendor contact information, vendor branding graphics or sound, any shipping information, tax tables, and the like. The inclusion of the additional information is beneficial (although not required) as it renders the communication between the vendor websites and the Multi-Vendor CPU 210 more efficient since this additional information need not be transmitted from the vendor websites to the Multi-Vendor CPU 210 during, for example, the process of checking out wherein the Multi-Vendor CPU 210 calculates the invoice and creates the shipping bill for the items checked out. With the additional information kept centrally at the Multi-Vendor Shared Datastores (MV-SD) 212, only some unique vendor ID (which may be included in the description of each item selected for the universal shopping cart and/or central checkout procedure) is required and any other information pertaining to the vendor may then be obtained by cross-referencing the unique vendor ID against the vendor database.

Preferably but not necessarily, there is also included a product database, representing a database of products offered for sale by the participating vendors. Although the product database is optional, its inclusion within the Multi-Vendor Internet Commerce System (MV-ICS) 202 as part of the Multi-Vendor Shared Datastores (MV-SD) 212 renders the communication between the vendor websites and the Multi-Vendor CPU 210 more efficient as the full description of items selected by the consumers need not be transmitted from the vendor websites to the Multi-Vendor CPU 210 during, for example, the process of depositing an item into the centrally implemented universal shopping cart. With the centrally implemented product database in place, only some unique product ID is required and any other information pertaining to the selected item may then be obtained by cross-referencing the unique product ID against the product database.

The Multi-Vendor Internet Commerce System (MV-ICS) 202 also includes a plurality of sets of consumer-interface I/O modules 216, each of which (e.g., 216a) may be utilized by a different consumer at a respective consumer terminal to perform transactions with the vendor websites vis-a-vis Multi-Vendor Internet Commerce System (MV-ICS) 202. There are also shown a plurality of sets of vendor-site I/O modules 220, each of which includes a set of tools to be implemented at a vendor website to allow that vendor website to employ the Multi-Vendor Internet Commerce System (MV-ICS) 202 to conduct e-commerce with consumers. As shown in FIG. 2, vendor-site I/O modules 220 are generally coupled to the Internet 230, as are consumer-interface I/O modules 216 and Multi-Vendor Central System (MV-CS) 240.

Typically, these vendor-site I/O modules 220 may be implemented on the same page as that employed to display the items offered for sale. Each set of vendor-site I/O modules 220 (such as 220a) may include one or more of the following: a central shopping cart link for dropping items selected from the vendor website into the universal shopping cart that resides at the Multi-Vendor Shared Datastores (MV-SD) 212, a central sign-in link for allowing a consumer to authenticate himself/herself with the Multi-Vendor Internet Commerce System (MV-ICS) 202, a central checkout link for allowing a consumer to quickly checkout an item selected from the vendor website, a gift link for allowing a consumer to place an item selected from the vendor website into the gift registry, a remind-me link for allowing a consumer to place an item selected from the vendor website into the remind-me registry.

The universal shopping cart represents a cross-vendor shopping cart associated with the Multi-Vendor Internet Commerce System (MV-ICS) 202 and is a part the Multi-Vendor Shared Datastores (MV-SD) 212. The universal shopping cart is a persistent storage structure that is capable of holding items for purchases that have been selected by the consumer from a plurality of vendor websites until those items are checked out. The central checkout link represents a link that allows an item selected from the vendor website to be checked out using the central checkout facility associated with the Multi-Vendor Internet Commerce System (MV-ICS) 202. Another central checkout link exists in the shopping cart presentation page, which may be viewed by the consumer as part of the consumer interface I/O modules 216 that allow the consumer to checkout items from the universal shopping cart. The central gift link allows a consumer to place an item selected from the vendor website into the universal, cross-vendor gift registry that exists at the centrally implemented Multi-Vendor Internet Commerce System (MV-ICS) 202 and is part of the MV-SD 212. Like the universal shopping cart, the universal gift registry is a persistent storage structure that is capable of holding items for purchases that have been selected by the consumer from a plurality of vendor websites until those items are checked out by the gift-giver (i.e., another consumer who is registered with the Multi-Vendor Internet Commerce System (MV-ICS) 202 who wishes to purchase one or more of the gifts in the gift registry for the gift registry holder).

The remind-me registry is similarly another persistent storage structure associated with the Multi-Vendor Shared Datastores (MV-SD) 212 that is capable of holding items of interest that have been selected by the consumer from a plurality of vendor websites. Each item within the remind-me registry may be associated with a reminder action, which the consumer may set to remind him/her to purchase the selected item(s) stored therein. Other vendor-site I/O modules are also possible, including different types of tools, registries and lists that are accessible by the participating vendor websites. By way of example, one of the registries may represent a bidding basket, which may also be another persistent storage structure associated with the Multi-Vendor Shared Datastores (MV-SD) 212 that is capable of holding items of interest that have been selected by the consumer from a plurality of vendor websites. Since the bidding registry is associated with the Multi-Vendor Internet Commerce System (MV-ICS) 202, and is more specifically one of the shared resources of the Multi-Vendor Shared Datastores (MV-SD) 212, items in the bidding basket may be bid on by other vendors who may be able to offer a lower price, for example.

Consumer-interface I/O modules 216 represent the tools and displays that allow the vendor websites and the consumer to communicate with one another via Multi-Vendor Internet Commerce System (MV-ICS) 202. In general, these consumer-interface links differ from the vendor-site I/O modules 220 in that they involve items and actions that are cross-vendor in nature. Further, these consumer-interface links may be implemented on any page that is viewable on the consumer's web site. The consumer-interface I/O modules 216 may include one or more of the following: a central sign-in link for allowing a consumer to authenticate himself/herself with the Multi-Vendor Internet Commerce System (MV-ICS) 202, a view gift registry link for allowing the consumer to inspect the content of his gift registry at the Multi-Vendor Internet Commerce System (MV-ICS) 202, a view account link for allowing a consumer to view his or her account with the Multi-Vendor Internet Commerce System (MV-ICS) 202 (including, for example, viewing past invoices and editing the consumer personal/payment/shipping data), a view other gift registries link for allowing a consumer to view gift registries of other consumers that have registered with the Multi-Vendor Internet Commerce System (MV-ICS) 202 (so that he/she can make a gift purchase for the gift registry-holder, for example), a view universal shopping cart link so that the consumer may view the content of his/her universal shopping cart stored with the Multi-Vendor Internet Commerce System (MV-ICS) 202, and a checkout link (typically but not necessarily implemented on the page that displays the universal shopping cart) for allowing the consumer to check out one or more items stored in the universal shopping cart, and the like. The above list is only illustrative and not exhaustive and therefore should not be viewed as limiting the scope of the invention.

In the described embodiment, Multi-Vendor CPU 210 includes one or more of the following: gift registry logic, shopping cart logic, sign-in logic, checkout logic, and conveyance logic. Some of the functions that may be performed by these logic units include access control and communication of the appropriate data in the Multi-Vendor Shared Datastores (MV-SD) 212 to the consumer terminals and/or the web sites. Access control is important for confidentiality and security reasons. By way of example, although the universal shopping cart may contain items from multiple vendors, it is generally desirable to convey to a vendor only information pertaining to items from that vendor's website when the consumer checks out the items from the shopping cart.

With respect to the various logic units within Multi-Vendor CPU 210, gift registry logic represents the logic for receiving items from the various websites that have been selected by the consumers to be placed into the various gift registries. Gift registry logic also permits the consumer to search gift registries, view, add an item to, remove an item from, or make a purchase from a gift registry. Since both the gift registry and the gift registry logic are implemented with the Multi-Vendor Internet Commerce System (MV-ICS) 202, they are typically cross-vendor in nature. Likewise, shopping cart logic represents the logic for receiving items from the various websites that have been selected by the consumers to be placed into the universal shopping cart. Shopping cart logic also permits the consumer to view, add an item to, remove an item from, or make a purchase from the universal shopping cart.

Sign-in logic represents the logic for presenting the authentication page to the consumer and performing the authentication. For a consumer who is new to the Multi-Vendor Internet Commerce System (MV-ICS) 202, sign-in logic also performs the function of registering the new consumer and collects personal/payment/shipping data to be stored in the consumer profiles in the consumer database (part of MV-SD 212). Checkout logic represents the logic for checking out items selected for purchase. The items may be selected directly from the website and checked out via the checkout logic within Multi-Vendor CPU 210 or from the universal shopping cart. Checkout logic includes intelligence for calculating tax, shipping, subtotals, totals, and the like using data from such sources as the selected items, the consumer database, merchant database (and optionally the product database), and so on. Checkout logic also performs the function of preparing the invoice, presenting the invoice to the consumer, obtaining any necessary and/or additional information pertaining to payment/shipping, and receiving the approval from the consumer for completing the transaction.

In the described embodiment, conveyance logic represents the logic for communicating the information to each vendor about the item(s) purchased from that vendor, the amount of the purchase, and any shipping information. If the Multi-Vendor Internet Commerce System (MV-ICS) 202 acts as the merchant of record, the consumer's credit card or account may be debited by the checkout logic. On the other hand, if the merchants of record are the vendors themselves, conveyance logic may also transmit the payment data (e.g., credit card information) to the vendors so that the amount of purchased from each vendor may be debited.

In this manner, the Multi-Vendor Internet Commerce System (MV-ICS) 202 allow vendors who are otherwise unrelated and/or totally unknown to one another to share an Internet commerce system. As long as a vendor registers its profile with the centrally implemented Multi-Vendor Central System (MV-CS) 240 and its website can communicate to the vendor-site I/O modules 220 to transmit data pertaining to the items selected by the consumer for the universal shopping cart and/or checkout using the Multi-Vendor Internet Commerce System (MV-ICS) 202 facility, such vendor can be e-commerce enabled, i.e., can sell their merchandise through the Internet. In one embodiment, the central checkout link and the central shopping cart link may be implemented simply as HTML links from each item of merchandise. When invoked, the central checkout link or the central shopping cart link simply sends the information pertaining to the item of merchandise selected, along with the consumer identity, to the Multi-Vendor Central System (MV-CS) 240. The Multi-Vendor Internet Commerce System (MV-ICS) 202 then interacts with the consumer through the consumer terminal and the consumer-interface I/O modules 216 to facilitate the shopping cart experience and the checkout process. In one embodiment, if the user identity is unknown, the user identity may be ascertained using the sign-in facility from the Multi-Vendor Internet Commerce System (MV-ICS) 202 itself.

Figure 3:
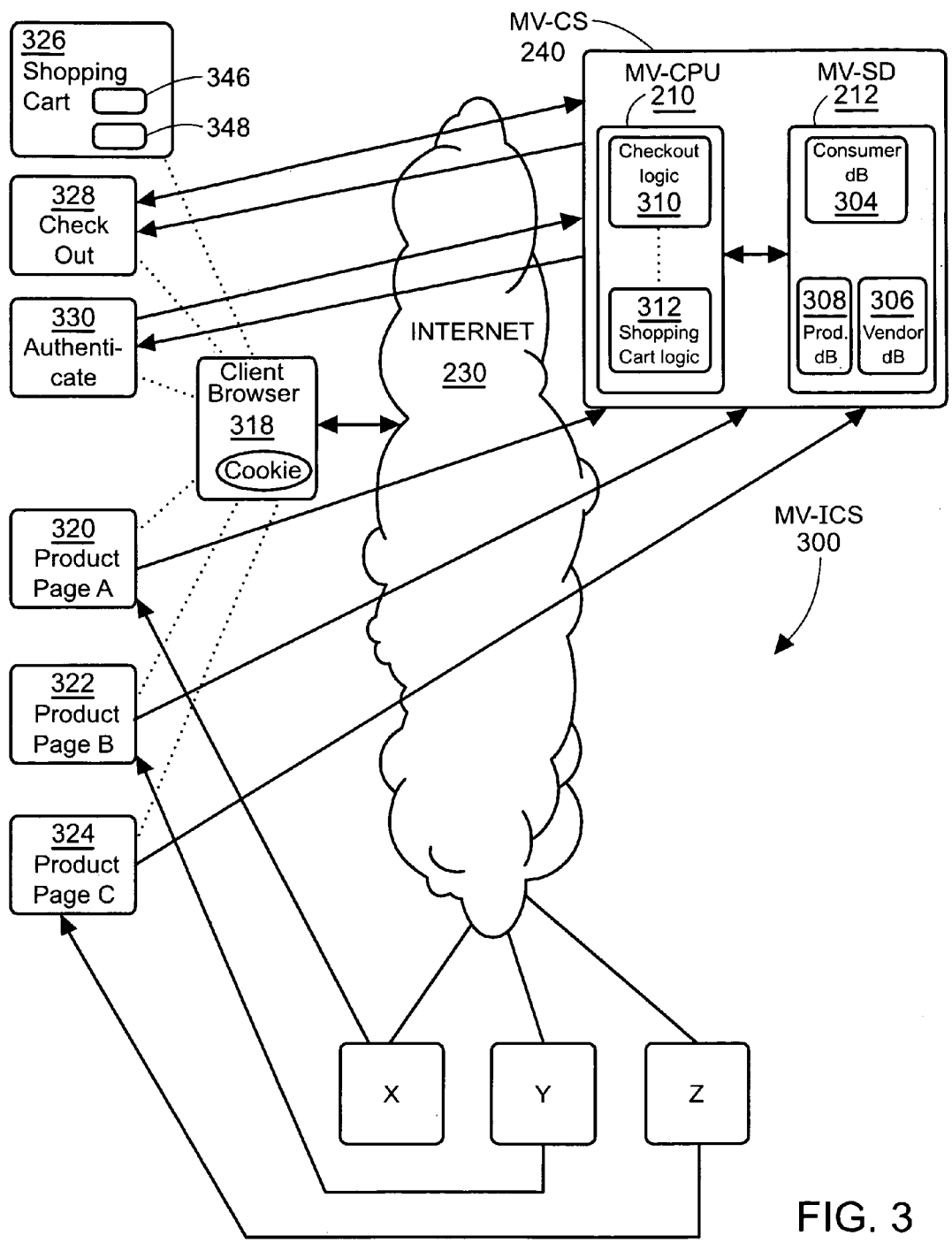
FIG. 3 illustrates an exemplary implementation of a multi-vendor Internet commerce system.

To further facilitate an appreciation of the features and advantages of the Multi-Vendor Internet Commerce System (MV-ICS) 202 of the present invention, FIG. 3 illustrates, in one exemplary implementation, a Multi-Vendor Internet Commerce System (MV-ICS) system 300, which includes a centrally implemented Multi-Vendor Central System (MV-CS) 240, which includes a Multi-Vendor CPU 210 and a Multi-Vendor Shared Datastores (MV-SD) 212. As mentioned earlier, Multi-Vendor Shared Datastores (MV-SD) 212 includes at least a consumer database 304, a vendor database 306, as well as an optional product database 308. To simplify discussion, only the checkout logic 310 and the shopping cart logic 312 of Multi-Vendor CPU 210 are shown in FIG. 3 although it should be understood that other types of logic modules may be implemented within Multi-Vendor CPU 210.

Figure 1:
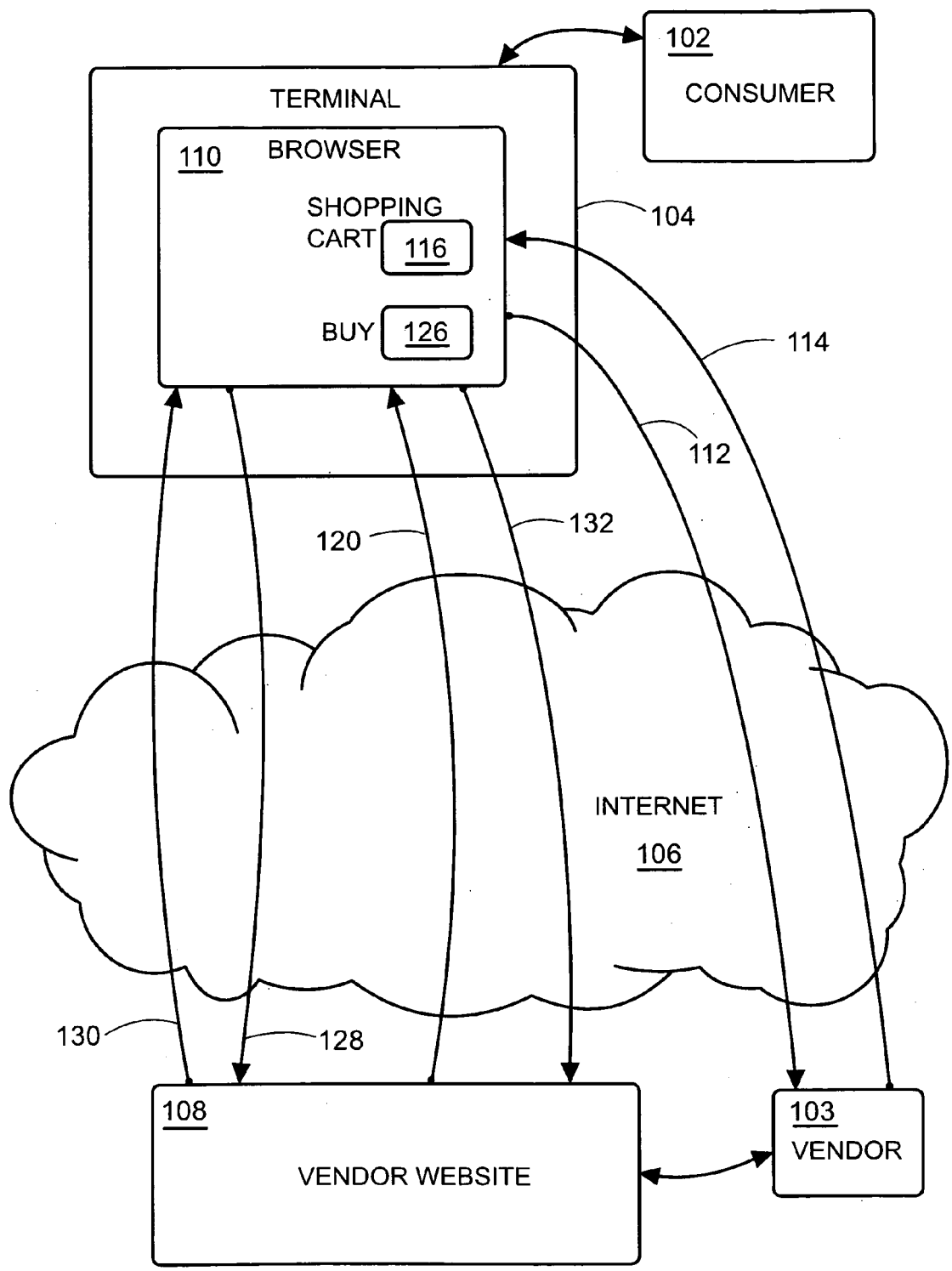
FIG. 1 illustrates a simplified representation of a prior art e-commerce arrangement.

With reference to FIG. 3, Multi-Vendor Central System (MV-CS) 240 is shown coupled to the Internet 230. Also shown coupled to Internet 230 are three exemplary vendor websites X, Y, and Z, representing the websites that implement the product offerings of the three independent vendors. In the example of FIG. 3, vendor X represents a vendor who has an existing e-commerce website and existing proprietary shopping cart facility and checkout facility similar to those described in connection with FIG. 1. For this example, vendor Y represents a vendor who has their catalog of product offerings hosted by the Multi-Vendor Internet Commerce System (MV-ICS) network, while vendor Z represents a vendor who has not or has no desire to develop a catalog and merely wishes to have the ability to sell items described in simple linkable pages of text and/or graphics (e.g., such as an HTML page). Techniques for enabling these vendors to offer their products for sale through the Multi-Vendor Internet Commerce System (MV-ICS) 300 and to allow consumers of their products to utilize the cross vendor universal shopping cart and checkout logic of Multi-Vendor Central System (MV-CS) 240 are discussed subsequently herein.

Also shown in FIG. 3 is a client browser 318, representing the consumer interface through which a consumer may interact with the product offering pages provided by vendor website X, vendor website Y, and vendor website Z, as well as to perform actions such as sign-in/registration to the Multi-Vendor Internet Commerce System (MV-ICS) system, to view the product offerings offered by the vendors and select items for the shopping cart and/or checkout, to view the universal shopping cart that contains products from multiple vendors, and to perform the checkout on the products selected at one of the product offering pages viewed on client browser 318. The exemplary product offering pages associated with vendors X, Y, and Z are shown as pages 320, 322, and 324.

A page 326 is also shown, representing the page for displaying the universal shopping cart transmitted from Multi-Vendor Central System (MV-CS) 240 when the consumer either drops an item from one of the pages 320, 322, or 324 into the universal shopping cart or when the consumer requests to view the contents of the universal shopping cart by clicking on an appropriate button. A checkout page 328 is shown, representing the page provided by Multi-Vendor Central System (MV-CS) 240 when the consumer selects to checkout by invoking the central checkout link associated either with the universal shopping cart display page 326 or one of the items listed in the product pages 320, 322, or 324. There is also shown a sign-in/registration page 330, representing the page employed by the consumer to authenticate himself with the Multi-Vendor Internet Commerce System (MV-ICS) 300 or to sign-in as a new consumer to register with the Multi-Vendor Internet Commerce System (MV-ICS) 300.

In operation, when a consumer, through client browser 318, enters a universal resource locator (URL) associated with vendor X, the X product page 320 may be viewed on client browser 318 (typically, after going through the introductory pages and/or some sign-in process which vendor website X may require and is irrelevant to the purpose of the invention herein). On X product page, there may be already implemented a local shopping cart link and a local checkout link, which allows the consumer to have access to a local shopping cart that is specific to vendor X and to checkout through vendor X in the manner discussed with prior art FIG. 1.

However, the presence or absence of the local shopping cart link and the local checkout link is irrelevant to the present invention. In fact, one of the advantages of the inventive Multi-Vendor Internet Commerce System (MV-ICS) 300 is its ability to work with any type of vendor website irrespective of the level of e-commerce facility that is present or absent. As long as a central shopping cart link can be associated with an item of merchandise to transmit a unique description of that item of merchandise (or a more complete description which includes the price and merchant identification), the vendor can be selling that item through the Internet and receive shipping and payment data pertaining to the purchase of that item from the Multi-Vendor Internet Commerce System (MV-ICS) 300 (by a non-web method such as fax or mail if desired).

To enable vendor X to participate in the Multi-Vendor Internet Commerce System (MV-ICS) 300, each item offered for sale by vendor X on X product page 320 may be provided with a central shopping cart link 330, which represents a link for passing certain information pertaining to the item (and preferably the consumer identification) to the Multi-Vendor Central System (MV-CS) 240 when the central shopping cart link associated with that item is invoked. By way of example, if X product page sells light bulbs, the invocation of a central shopping cart link 330 associated with a 75-watt light bulb would cause the description of the 75-watt light bulb to be transmitted to Multi-Vendor Central System (MV-CS) 240 via the Internet 230.

Figure 4:
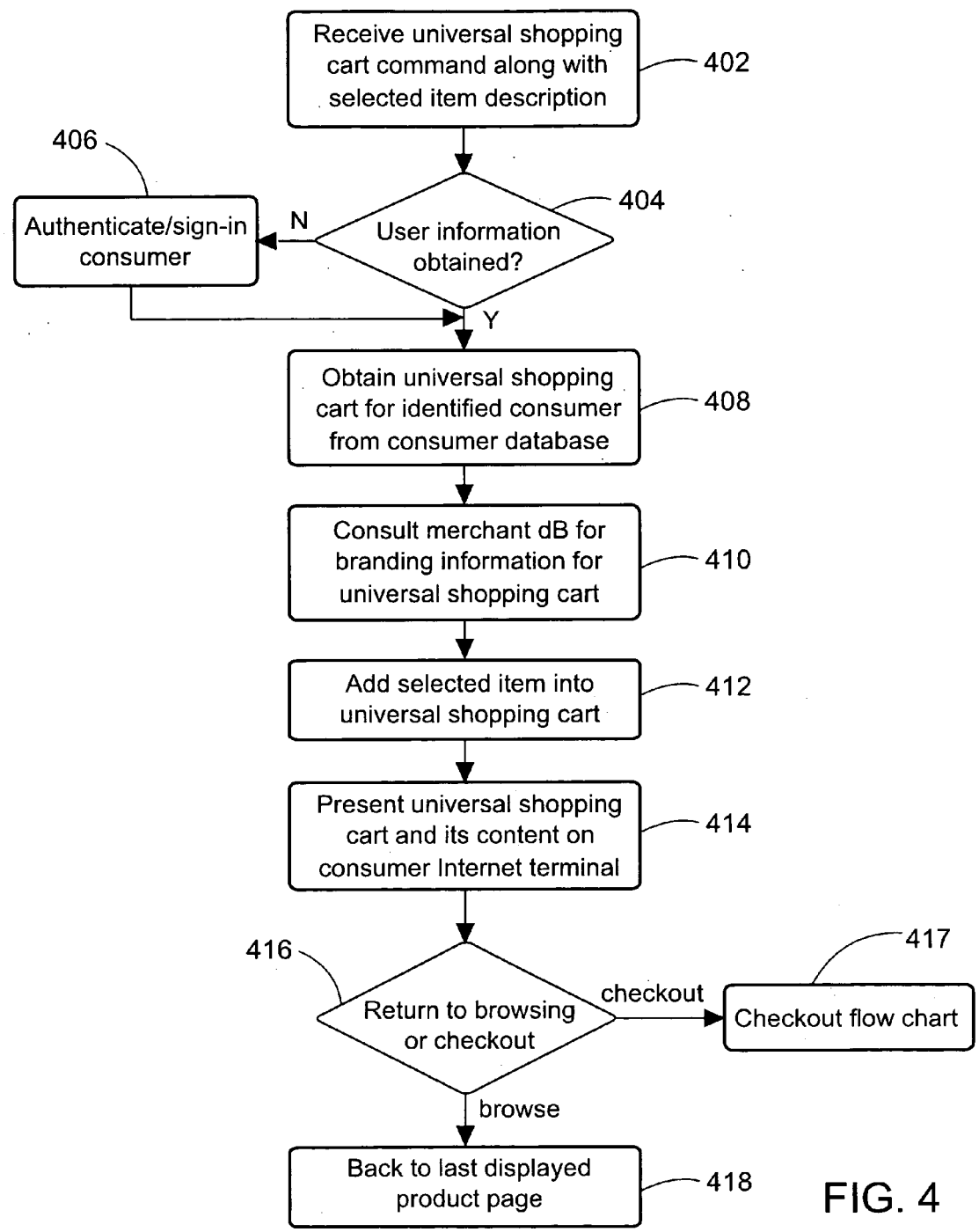
FIG. 4 is a flow chart of the steps taken when a universal shopping cart command is received.

With reference to FIG. 4, the receipt by the Multi-Vendor Central System (MV-CS) 240 of the command to drop a selected item into the universal shopping cart is shown as step 402 of FIG. 4.

If the consumer employs an Internet terminal through which he has earlier registered with Multi-Vendor Central System (MV-CS) 240 or interacts with Multi-Vendor Central System (MV-CS) 240, there is typically cached at that Internet terminal some persistent information pertaining to the consumer, which may be passed along to Multi-Vendor Central System (MV-CS) 240 when the central shopping cart link is invoked on a browser displayed on that Internet terminal. In the current technology, such persistent consumer information may be stored in the form of a cookie that resides at the client terminal and is passed along with the product identification to Multi-Vendor Central System (MV-CS) 240 when the central shopping cart link associated with an item is invoked.

If the consumer's cookie is present (as ascertained by the Multi-Vendor Central System (MV-CS) in step 404 of FIG. 4), the consumer information within the cookie is employed to ascertain the identity of the consumer who has requested that the selected item be dropped into his/her universal shopping cart. On the other hand, if there is no user information present (i.e., no cookie), the transmission of a command to drop an item into a universal shopping cart (or to checkout a selected item using the Multi-Vendor Internet Commerce System (MV-ICS) 300) will cause Multi-Vendor Central System (MV-CS) 240 to send a sign-in/registration page to client browser 318 to either authenticate consumer with the Multi-Vendor Central System (MV-CS) 240 (if the consumer already registered earlier but on another Internet terminal) or to register if the consumer is not one who has previously registered with the Multi-Vendor Internet Commerce System (MV-ICS) 300. The transmission of the sign-in/registration page 330 and the receipt of the sign-in/registration information is shown via path 340 and 342 in FIG. 3. Note that the sign-in/registration is performed by the Multi-Vendor Central System (MV-CS) 240 and requires no action on the part of the vendor website. In other words, there is no need to implement a sign-in/registration facility in the vendor website with the Multi-Vendor Internet Commerce System (MV-ICS) 300 to enable e-commerce. On the Multi-Vendor Central System (MV-CS) 240 side, this sign-in/registration step is shown as step 406 of FIG. 4.

At any rate, the consumer identity is ascertained by the Multi-Vendor Central System (MV-CS) 240, either through a cookie or by the sign-in/registration procedure. Once the consumer identity is ascertained, the Multi-Vendor Central System (MV-CS) 240 obtains the universal shopping cart from consumer database 304 or another database that stores the universal shopping cart of the identified consumer. From the perspective of the Multi-Vendor Central System (MV-CS) 240, step 408 shows the step of obtaining the universal shopping cart for the identified consumer from the consumer database.

In one embodiment, it may be recognized that although the universal shopping cart is cross-vendor and therefore does not need to be branded with any vendor identification, it may be less confusing for the consumer if the shopping cart is provided with the branding information associated with the last vendor from whom the consumer selected an item to be placed in the universal shopping cart. By way of example, when a consumer selects an item offered for sale by vendor X, it is less disorienting for the consumer if the universal shopping cart page that displays the universal shopping cart reflects in some manner the fact that the consumer has just selected an item from vendor X to be placed into the universal shopping cart. However, it is contemplated that additional branding and/or advertising is not precluded; the point is to identify, in one embodiment, in some manner at the universal shopping cart the vendor from whom the consumer has just selected an item.

For this reason, the vendor database 306 may be consulted, using the vendor information that is associated with the items selected to be dropped into the universal shopping cart, for any branding information (such as graphics or sound). This step is shown in FIG. 4 as step 410. Furthermore, the selected item that is transmitted from X product page 320 to Multi-Vendor Central System (MV-CS) 240 is then added to the universal shopping cart (step 412 of FIG. 4). Preferably, the universal shopping cart and its content are then presented to the consumer via client browser 318 in a suitable display page (step 414 of FIG. 4). Depending on the level of details of the information stored in the universal shopping cart on Multi-Vendor Central System (MV-CS) 240, it may be necessary to consult product database 308 to obtain an adequate level of details of the products in the universal shopping cart prior to displaying the shopping cart page 326 to the consumer via client browser 318.

If the consumer wishes to browse further, he may click on a return-to-browsing link 346 which implements a link to the last product page displayed before the consumer selects to drop an item into the universal shopping cart (steps 416 and 418 of FIG. 4). Subsequently, the consumer may select additional items from the same vendor or even from different vendors who have registered with the Multi-Vendor Internet Commerce System (MV-ICS) 300 to add additional items into the universal shopping cart at Multi-Vendor Central System (MV-CS) 240. Note that since the universal shopping cart is implemented independently of the website of the vendors, it is possible to have one single shopping cart that contains items from multiple vendors from multiple websites.

While viewing the shopping cart page 326, the consumer may also invoke the central checkout link 348 to initiate the checkout process via Multi-Vendor Central System (MV-CS) 240. Invoking the central checkout link 348 causes checkout logic 310 to begin processing the items slated for checkout within the universal shopping cart. In some cases, the consumer may wish to hold one or more of the items instead of checking them out, e.g., for further comparison shopping or other purposes. Once Multi-Vendor Central System (MV-CS) 240 receives the instruction to begin checking out items (step 502 of FIG. 5), the cost for each item to be checked out is calculated from the universal shopping cart and shared databases of Multi-Vendor Central System (MV-CS) 240 (step 504 of FIG. 5). The cost of each item may be influenced by tax, shipping, any discount or promotion, and the like.

Figure 5:
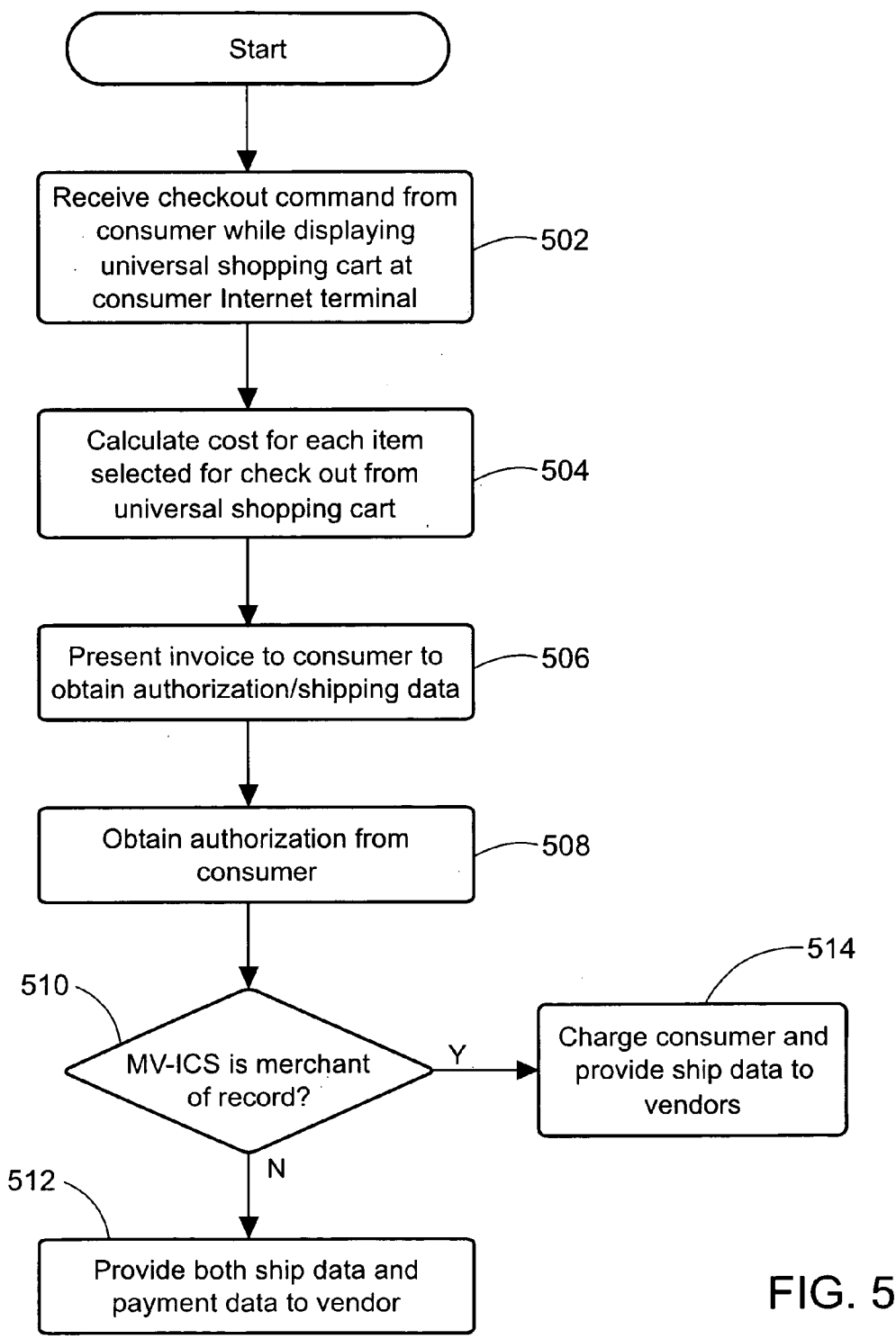
FIG. 5 is a flow chart of a check out process.

Thereafter, checkout logic 310 of Multi-Vendor Central System (MV-CS) 240 may present a checkout page 328, which shows the invoice to consumer along with any shipping data and/or payment data obtained from the consumer profile in consumer database 304 (step 506 of FIG. 5). The consumer then has the option of accepting the default information or may edit to, for example, provide another address to ship to or use a different credit card than the default credit card. Once the consumer authorizes the purchase (step 508 of FIG. 5) and the authorization is received at Multi-Vendor Central System (MV-CS) 240, Multi-Vendor Central System (MV-CS) 240 may then convey the correct portion of the invoice to the appropriate vendor(s). In one embodiment, the ship data (e.g., the item description, the name of the recipient and the shipping address) and the payment data (e.g., the information pertaining to the account information to be charged to the consumer) is forwarded to the vendor to allow the vendor to perform the actual charging of the consumer's account (steps 510 and 512 of FIG. 5). Preferably but not necessarily, the conveyance to each vendor may be encrypted.

In one advantageous embodiment, it is contemplated that the conveyance of the portion of the invoice to each of the vendors may be done using a non-web paradigm (such as fax, phone, or mail) to maximize security. The use of a non-web method to convey the ship data (and the payment data) also permits vendors who have not equipped their websites to receive these types of data to participate in e-commerce using widely available and proven settlement techniques (such as manually entering the credit card information received by phone/fax into a point-of-sale terminal) and manually ship the items using the ship data received via phone or fax or mail.

Still further, the Multi-Vendor Internet Commerce System (MV-ICS) 300 may act as the merchant of record and may proceed to charge the price of the invoice against the account of the consumer so that no account information needs to be transmitted to the vendors. This is another advantageous arrangement since it minimizes the security and fraud risks involved in transmitting sensitive consumer payment data (e.g., credit card information) and storing such information at multiple vendor websites. In this case, the sensitive data is kept at the Multi-Vendor Central System (MV-CS) 240 and the access thereto is guarded by the Multi-Vendor CPU 210. In this case, only the consumer's shipment information along with the identification of the items to be shipped need to be transmitted to the vendor (step 514). Since there is less concern with confidentiality (due to the absence of sensitive payment information), this information can be conveyed to the vendors using web-based paradigm if desired or by a non-web paradigm if appropriate.

Figure 6:
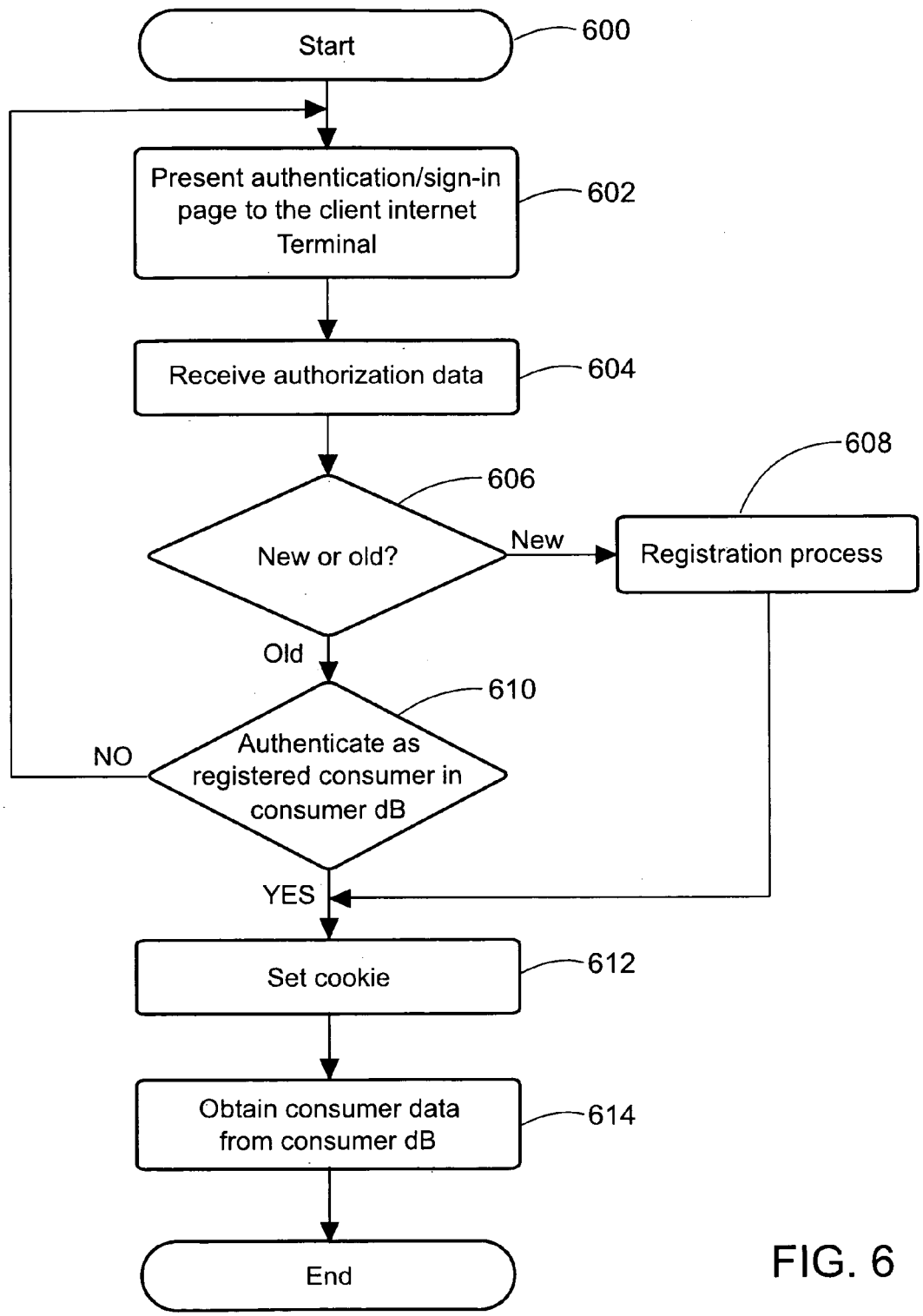
FIG. 6 is a flow chart of a sign-in/registration process.

FIG. 6 illustrates, in accordance with one embodiment of the present invention, an exemplary sign-in/registration process, which may be initiated by either the Multi-Vendor Central System (MV-CS) 240 or by the consumer upon clicking on link on the vendor's web page (or any webpage that may link such a request to Multi-Vendor Central System (MV-CS) 240. In general, a consumer may request to be authenticated/signed-in at any time after accessing a vendor website that is part of the Multi-Vendor Internet Commerce System (MV-ICS) 202. Early authentication (or sign-in) is advantageous since it allows the Multi-Vendor Central System (MV-CS) 240 to customize the display to the identified customer's preferences and settings sooner in the shopping experience, which is beneficial from an ease-of-use standpoint.

However, certain events may also cause the Multi-Vendor Central System (MV-CS) 240 to initiate the sign-in/registration procedure. By way of example, the selection of an item on a product offering page for adding to the universal shopping cart may cause the Multi-Vendor Central System (MV-CS) 240 to initiate the sign-in/registration procedure if no user information can be ascertained to determine in the user database the identity of the user who has just selected the item to be added to a universal shopping cart. This is because the Multi-Vendor Central System (MV-CS) 240 needs to know the identity of the consumer in order to obtain the right universal shopping cart to add the selected item to. As mentioned earlier, the absence of a cookie associated with the Multi-Vendor Central System (MV-CS) 240 typically signifies that the consumer is either new (unregistered) or has not employed this Internet terminal to conduct Internet commerce transaction via the Multi-Vendor Internet Commerce System (MV-ICS) 202.

With reference to FIG. 6, the sign-in/registration process begins with the presentation of the sign-in/registration page to the consumer at the consumer's Internet terminal in step 602. In step 604, the authentication data is received from the consumer. In step 606, the consumer is asked whether the consumer is a new (i.e., not registered) consumer or a registered consumer who wishes to employ the Multi-Vendor Internet Commerce System (MV-ICS) again to conduct the Internet commerce transaction. If the consumer is a new, unregistered consumer, the Multi-Vendor Central System (MV-CS) proceeds to step 608 to initiate the registration process for the new consumer. On the other hand, if the consumer indicates that he/she is a consumer already registered in the consumer database, the method proceeds to step 610 wherein the consumer is authenticated (e.g., using a shopperID/password procedure or some biometrics procedure).

If not authenticated, the method returns to step 602 to begin the authentication/sign-in process again. On the other hand, if the consumer is authenticated as a previously registered consumer or as a new consumer (via step 608), the method proceeds to optionally set a cookie at the consumer's Internet terminal (step 612). Thereafter, the consumer data is obtained from the consumer database for the purpose of correlating the identified consumer with the action that requires his/her identity.

So far, the discussion has mostly revolved around vendor websites that are catalogs or databases in the traditional sense. In one embodiment, a vendor may be e-commerce enabled by simply furnishing a database of product information (which includes description and price) as well as product IDs. Using a data driven page having the vendor-site I/O modules 220 implemented thereon and the links pertaining thereto formed from the items displayed, a vendor can very quickly become e-commerce enabled. As the consumer flips the "pages," the displayed item(s) change, which cause the data-driven portion of the link(s) that underlie the vendor-site I/O module to change. To further elaborate, the data-driven portion of the links represent the description of the item being displayed, the price, the page to return to after the shopping cart is viewed, and the like. Other pieces of information in the link (such as the destination for the link) may stay substantially unchanged.

Furthermore, there is no need to have a database to participate in e-commerce given the present invention. As long as a link can be implemented on a page to link to an item to be offered for sale (and the description/price/merchant identification can be ascertained from a combination of information contained in the link and the databases at Multi-Vendor Central System (MV-CS) 240), it is irrelevant whether the underlying data is implemented as a database or simply raw HTML pages. In a simple example, an HTML with a linkable word, image, or any area of the screen within the page boundaries may be pasted with HTML code linking that linkable portion to the Multi-Vendor Central System (MV-CS) 240. As long as the underlying link is provided with description information pertaining to the item offered for sale to be transmitted to the Multi-Vendor Central System (MV-CS) 240 and the combination of information contained in the link and the databases at Multi-Vendor Central System (MV-CS) 240 can yield the selected item's identification, its price, its vendor, the shipping charges and practices of its vendor, the Multi-Vendor Internet Commerce System (MV-ICS) 202 can handle consumer authentication/ registration, shopping cart implementation, and checkout and send the shipping data (and optionally payment data) to the vendor for shipping and settlement, using either a web-based method or non web-based methods.

FIG. 7 illustrates a representative HTML snippet 700 encoded in an exemplary vendor page to facilitate a purchase in accordance with an embodiment of the invention. It should be noted that the snippet 700 can be used for an "Add to Cart" transaction as well as, for example, "Add to Wish List" or an "Add to Gift Registry" transaction. When a user clicks on, for example, an "Add to Cart" button, the snippet 700 (which has typically been encoded by the merchant-vendor) is invoked. A message packet is then sent on to the Multi-Vendor Internet Commerce System (MV-ICS) 202. In one embodiment, the message packet includes such information as: MerchantID, ProductName, SKU#, Quantity, Price, and Return URL. These pieces of data (in the form of the message packet) taking the form of an HTTP request are transmitted over, for example, the Internet from the user's browser to the Multi-Vendor Internet Commerce System (MV-ICS) 202. Typically, in response to the received HTTP request, the Multi-Vendor Internet Commerce System (MV-ICS) 202 displays a particular document, or page, on the user's browser. In the case of the "Add to Cart" transaction, the user's personal shopping cart with the particular product identified by the snippet 700 is included therein.

As an example, the Add to Cart snippet 700 includes HTML code and corresponding data fields. In the illustrated example of FIG. 7A, the code section "http://www.catalogcity.com/" represents the destination address of the server implementing the Multi-vendor Central System (MV-CS). The code section represents "external/addprod.cfm" represents to command to the MV-CS server to process this HTML code in accordance to the fields specified therewith. The code section "ccpid=754369" represents the code section that includes the vendor's merchant ID to uniquely identify the vendor. The code section "cmd=s" represents the command to add the item associated with this HTML code to the shopping cart. Note that this code section may also read, for example, "cmd=g" (as shown in FIG. 7B) to represent the command for adding the item to the gift registry. The code section "rtn=http%3A%2F%2Fwww%2-Eamazon%2Ecom%2Fexec%2Fobidos% 2FASIN%2F045-1191145%2Fo%2Fqid%3D930776352%2Fsr%3D2%2D-1%2F002%2D02349 99%2D7522204" represents the code section that includes the return address of the page associated with the selected item. the code section "sku=24372" represents the code section that includes the SKU number of the item of merchandise (which is unique to each item of merchandise of the vendor). The code section "qty=1" represents the code section that includes the quantity selected. The code section "name=Ayn%20Rand%3A%-20Atlas%20Shrugged" that includes the name of the item of merchandise. The code section "price=7.19" represents the code section that includes the price of the item selected. The code section "ccsyn=1114" represents the code section that includes the merchant interface ID, e.g., the interface that includes the branding associated with the vendor to more quickly associated the item(s) viewed in the universal shopping cart with the vendor from whom the item(s) were bought.

FIG. 8 is a representative merchant input form 800 used to create the snippet 700 in accordance with an embodiment of the invention. The input form 800 includes an item code input field 802 used, for example, to input a particular product SKU. An item name file 804 is used to optionally input the product's name or other identifying nomenclature. A price field 806 is used to input the item's price while a return URL field 808 is used to input the return location of the vendor. It should be noted that the form of the input form 800 can be any form deemed appropriate for the application at hand.

Figure 9:
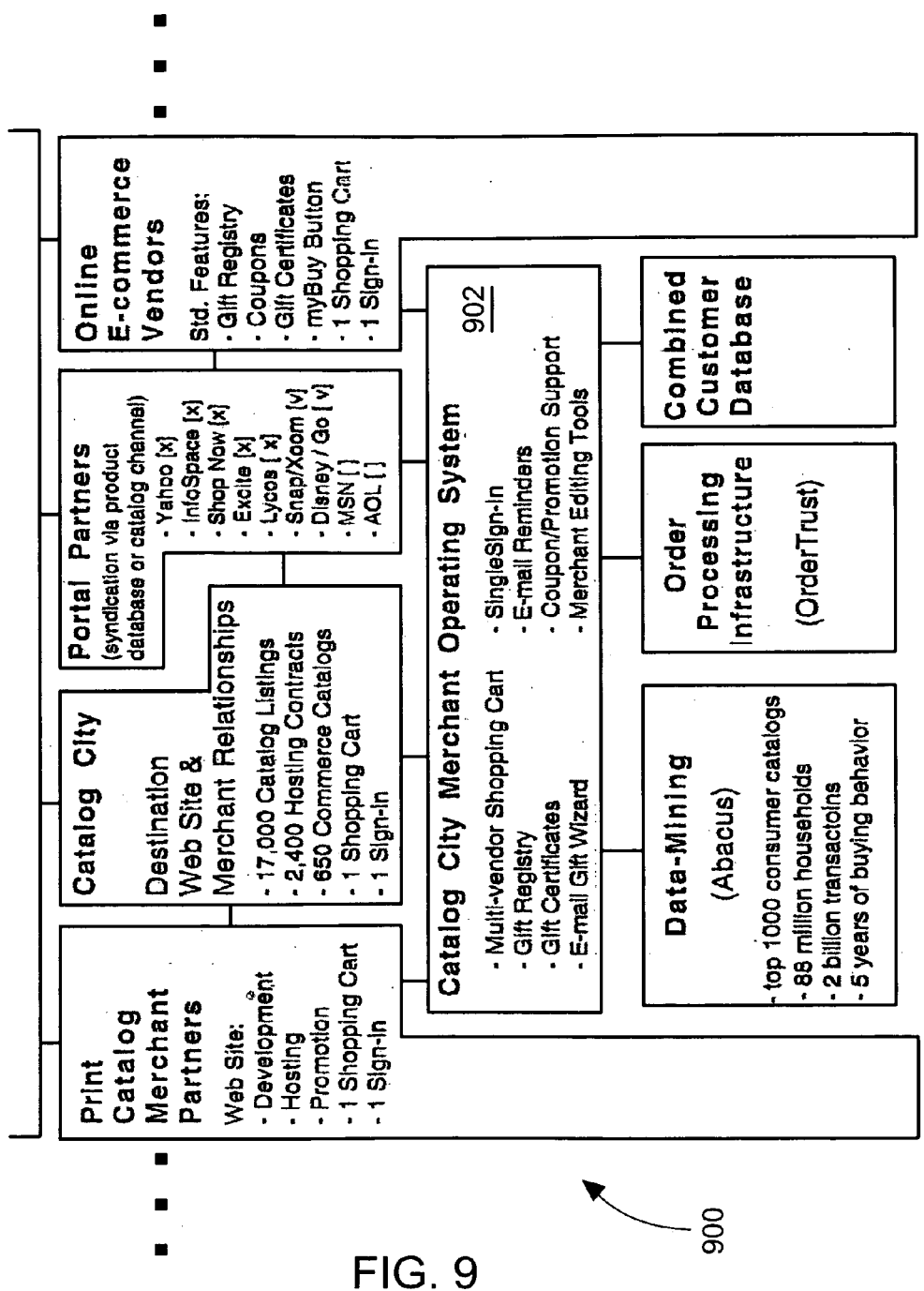
FIG. 9 illustrates a representative transactional architecture.

FIG. 9 illustrates a representative transactional architecture 900 in accordance with an embodiment of the invention. The architecture 900 includes a Multi-Vendor Central System (MV-CS) 902 arranged to provide a multi-vendor shopping cart, a gift registry, gift certificates, email capabilities such as email reminders, coupon and promotion support, as well as single sign on capability and merchant editing tools. It should be noted that the Multi-Vendor Central System (MV-CS) 902 is one implementation of the Multi-Vendor Central System (MV-CS) 202 described in FIG. 2. The Multi-Vendor Central System (MV-CS) 902 is coupled to various online e-commerce vendors 904 providing such features as gift registry, coupons, gift certificates, etc. Various portal partners 906 such as Yahoo, ShopNow, provide direct links between particular portals that provide various goods and services to the Multi-Vendor Central System (MV-CS) 902 (and in turn the consumers 908). In one embodiment, a combined customer database 910 is provided that accumulates selected consumer information useful in providing consumer profiles for such things as selectively mailing only those catalogs most likely to be appreciated by those consumers receiving them.

Referring now to FIG. 10, an exemplary product page 1000 representative of the vendor X product page 320 is shown. The product page 1000 includes an Add to Cart button 1002 as well as buttons 1004 and 1006 corresponding to a "My Gift" and "My Buy".

Figure 11:
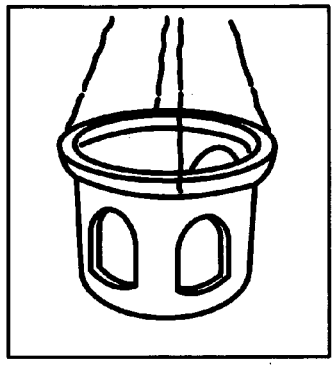
FIG. 11 illustrates an exemplary web page for a vendor whose catalog of product offerings is hosted by the multi-vendor Internet commerce system network.

FIG. 11 shows an exemplary web page for a vendor whose catalog of product offerings is hosted by the Multi-Vendor Internet Commerce System (MV-ICS) network as represented by product page 322.

FIG. 12 illustrates an exemplary web page for a vendor who has not or has no desire to develop a catalog, yet is e-commerce enabled as represented by the product page 320.

Figure 13:
FIG. 13 illustrates a universal shopping cart.

FIG. 13 illustrates the universal shopping cart as represented by page 326.

FIG. 14 illustrates an exemplary gift registry in accordance with an embodiment of the invention.

FIG. 15 illustrates an exemplary web page presented by the Multi-Vendor Central System (MV-CS) in accordance with an embodiment of the invention.

FIG. 16 illustrates an exemplary shopping cart web page associated with a vendor type X in accordance with an embodiment of the invention.

FIG. 17 illustrates an exemplary merchant input in support of a "My Stores" implementation.

Figure 18:
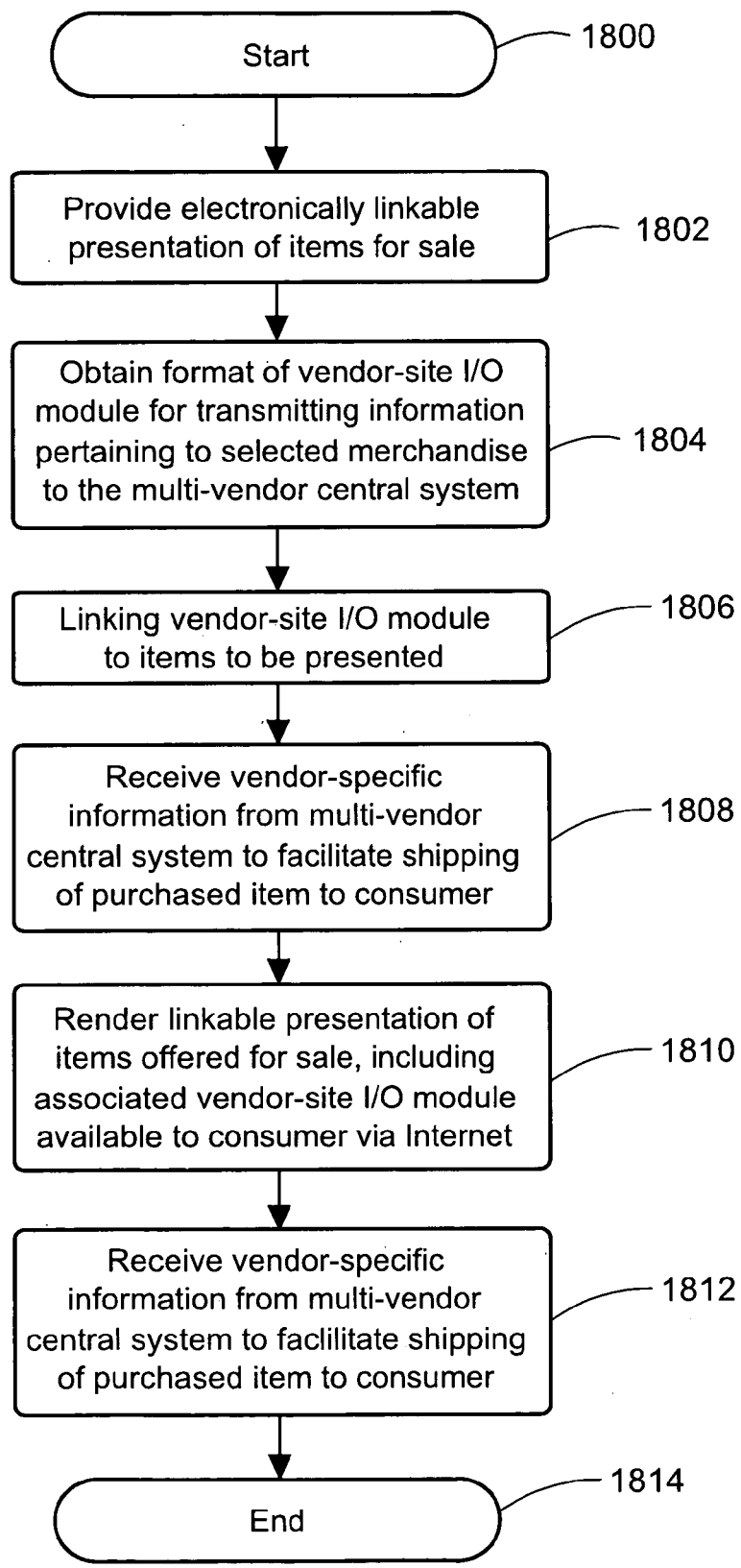
FIG. 18 is a flow chart of the steps taken by a vendor to become e-commerce enabled.

FIG. 18 illustrates, in accordance with one embodiment of the invention, the steps taken by a vendor to become e-commerce enabled through the use of the inventive Multi-Vendor Internet Commerce System (MV-ICS). Prior to the steps herein, it should be understood that the vendor needs to register with the Multi-Vendor Internet Commerce System (MV-ICS) operator, which may be performed using any web-based or non-web-based method. Registration permits the Multi-Vendor Internet Commerce System (MV-ICS) operator to have knowledge, at minimum, of the vendor and its contact information for the purpose of conveying data pertaining to items selected for sale thereto. In step 1802, the vendor (or a service that it contracts) provides an electronically linkable presentation of the items for sale. As mentioned earlier, this may be in the form of HTML pages or may be more elaborate database driven displays. Furthermore, the vendor may elect to have his paper catalogs scanned in and converted to an electronic format and then have electronic database (or HTML pages) hosted, which eliminates even the need for the vendor to be knowledgeable about the Internet and its enabling technologies.

In step 1804, the vendor obtains the format of the vendor-site I/O module, which is capable of being linked to the items to be offered for sale and provides at least the identity of the merchandise item selected to the Multi-Vendor Central System (MV-CS). Depending on the amount of information already furnished to the Multi-Vendor Internet Commerce System (MV-ICS), the amount of information necessary to uniquely identify the merchandise item selected may vary widely. At one end of the scale, databases centrally implemented at the Multi-Vendor Central System (MV-CS) may allow the vendor to simply send a unique identification code associated with the selected item through the vendor-site I/O module to the Multi-Vendor Central System (MV-CS) and all information pertaining to the vendor profile and the product information can be derived therefrom using the unique identification code as a search key into the centrally implemented databases at the Multi-Vendor Central System (MV-CS). At the other end of the scale, there may be little information at the centrally-implemented Multi-Vendor Central System (MV-CS) and the link may be employed to furnish all textual description, graphics, and price information pertaining to the selected items, along with as much of the vendor profile as necessary for the Multi-Vendor Central System (MV-CS) to perform the checkout process (which includes calculating the cost correctly for the item selected for purchase). The artisan will recognize that there are variations between these two extremes.

In step 1806, the vendor-site I/O module and the item associated therewith are linked together. Linking may be made on an item-by-item basis or may be made for an entire page, and an item or items selected for action by the Multi-Vendor Internet Commerce System (MV-ICS) on the vendor page will have its identification information sent to the Multi-Vendor Central System (MV-CS). In step 1808, the vendor renders the linkable presentation of the items for sale, including the vendor-site I/O modules implemented thereon, available to the consumer via the Internet upon request. In step 1810, the vendor receives the vendor-specific information from the Multi-Vendor Central System (MV-CS), which includes at least information to identify the item(s) purchased by a consumer from this vendor. As mentioned earlier, some of the personal data pertaining to the consumer may be made anonymous in one embodiment to provide privacy for the consumer. In a typical situation, the vendor is provided with the identification of the item(s) purchased, the identity of the purchaser and the shipping address, the chosen shipping method and any other special shipping instructions. If the vendor acts as the merchant of record, payment data is also received. If the Multi-Vendor Internet Commerce System (MV-ICS) acts as the merchant of record, the Multi-Vendor Internet Commerce System (MV-ICS) may charge the consumer's account (or credit card). In this latter case, the vendor may only receive an accounting statement and settlement from the Multi-Vendor Internet Commerce System (MV-ICS) (either concurrently with the transmission of the shipping data or at a later date). As mentioned, there is no need to convey the shipping data and/or payment data via a web-based method (although such may be preferred by some vendors, particularly using encrypted technologies). The use of non-web methods for conveying the shipping and/or payment data to the vendor advantageously renders the Multi-Vendor Internet Commerce System (MV-ICS)-based e-commerce enabling technique fully compatible with contemporary vendors who are not web-enabled.

Figure 19:
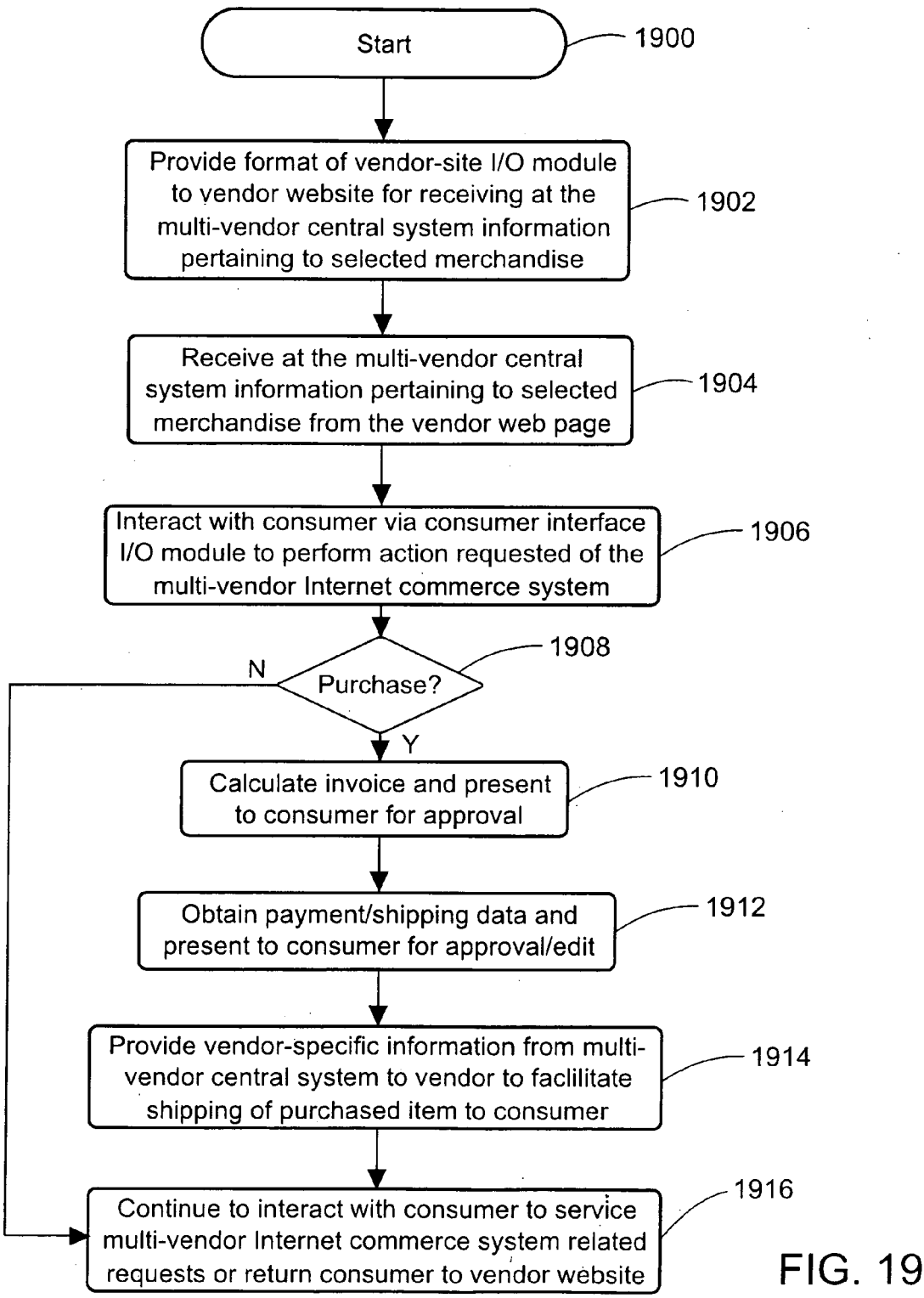
FIG. 19 is a flow chart of the steps taken by an operator of the Multi-Vendor Internet Commerce System.

FIG. 19 illustrates, in accordance with one embodiment of the present invention, the steps taken by the operator of the Multi-Vendor Internet Commerce System (MV-ICS) to offer e-commerce capabilities to a plurality of vendors who may be completely independent of one another but are registered to share the shared resources of the Multi-Vendor Central System (MV-CS). Prior to the steps herein, it should be understood that the vendor needs to register with the Multi-Vendor Internet Commerce System (MV-ICS) operator, which may be performed using any web-based or nonweb-based method. In step 1902, the format of the vendor-site I/O module is provided to the vendor to allow the vendor to create links to the merchandise items presented (e.g., displayed on a page).

In step 1904, the Multi-Vendor Internet Commerce System (MV-ICS) operator receives at the Multi-Vendor Central System (MV-CS) through the vendor-site I/O module information pertaining to an item selected by the consumer for action (e.g., from merchandise display page). In step 1906, the Multi-Vendor Central System (MV-CS) interacts with the consumer via the consumer-interface I/O module to perform the action requested by the consumer. Some of these actions, which are performed by the Multi-Vendor Internet Commerce System (MV-ICS) independent of the individual vendor websites after the identification of the selected item is ascertained, include the cross-vendor authentication/registration procedure (if the consumer has not already signed in prior to item selection for action), cross-vendor registries procedures, the cross-vendor shopping cart procedure, and the cross-vendor checkout procedure.

If the consumer wishes to make a purchase (step 1908), the Multi-Vendor Central System (MV-CS) may calculate and present an invoice for the item(s) selected for purchase and present the invoice, via the consumer-interface I/O module in step 1910, to the consumer for approval. In step 1912, the Multi-Vendor Central System (MV-CS) may obtain payment/shipping data from the consumer database and present such payment/shipping data, via the consumer-interface I/O module, to the consumer for edit/approval. If approved, the Multi-Vendor Central System (MV-CS) then provides vendor-specific information to each vendor involved (step 1914), which includes at least information to identify the item(s) purchased by a consumer from the vendor. The vendor-specific information has been described earlier in connection with step 1810 of FIG. 18. Thereafter, the Multi-Vendor Central System (MV-CS) may either continue to interact with the consumer, via the consumer-interface I/O module, to continue servicing the user's Multi-Vendor Internet Commerce System (MV-ICS) related requests or allow the user to return to the vendor's website(s) to continue browsing (step 1916).

As mentioned earlier, the inventive Multi-Vendor Internet Commerce System (MV-ICS) renders it possible for vendors to become e-commerce enabled without any undue investment in e-commerce infrastructures since the centrally-implemented Multi-Vendor Central System (MV-CS) performs many of the functions earlier required of each vendor website in its interaction with the web consumers. As long as a linkable presentation of the items to be sold (in either text, graphics, sound, or any other communication medium) can be provided to the consumer via the Internet, a link (in the form of vendor-site I/O modules) can be attached to the linkable presentation to allow the Multi-Vendor Central System (MV-CS) to obtain the information pertaining to the item(s) offered for sale and to allow the Multi-Vendor Internet Commerce System (MV-ICS) to interact with the consumer to perform the cross-vendor consumer registration procedure, the cross-vendor shopping cart procedure, and the cross-vendor checkout procedure.

The act of providing the linkable presentation (e.g., pages, emails, banners, etc.) of items to be sold may be performed by the vendor or may be performed by a hosting service which converts the images and text of the items to be sold (e.g., in paper form) to an electronic, linkable format (such as HTML). Likewise, the act of attaching a suitable link to the linkable presentation may also be performed by someone other than the vendor, e.g., by the hosting service, a web-design firm, or any suitable person. Since the link may be implemented as a data-driven template of HTML codes, the invention advantageously simplifies even this aspect, rendering it capable of being performed by relatively unsophisticated (technically speaking) persons.

Once the Multi-Vendor Central System (MV-CS) is furnished with the price of the item(s) offered for sale (as well as any other cost-related information such as the tax table, the discount schedule, and shipping/handling charges, if any, for the vendors) and the vendor contact information, the Multi-Vendor Central System (MV-CS) can perform the checkout procedure on behalf of each vendor and convey shipping information to each vendor from whom merchandise is purchased to allow the vendor to ship the item(s) purchased to the consumer. If the Multi-Vendor Internet Commerce System (MV-ICS) also acts as the merchant of record, some vendors may not even need to have any type of credit card point-of-sale facility and may instead arrange with the Multi-Vendor Internet Commerce System (MV-ICS) to allow the Multi-Vendor Internet Commerce System (MV-ICS) to charge the consumer for the purchased item(s) and to forward payment, either for each item or for batches of items, to the vendor (e.g., in the form of a check from the Multi-Vendor Internet Commerce System (MV-ICS) service). Again, the vendor may not need to receive the shipping data (and the payment data, if the vendor is the merchant of record) via a web-based mechanism. In this manner, the additional technology investment by an existing brick-and-mortar vendor to become e-commerce enabled may be kept to a bare minimum.

Further, the fact that many of the resources pertaining to the consumer, the universal shopping cart facility, the checkout facility, the gift registry, and the like, are shared across multiple independent and geographically dispersed vendors offers many of the benefits previously unattainable when these facilities are implemented piece-meal and in an isolated manner in each vendor website.

By way of example, the availability of the cross-vendor universal shopping cart opens up many applications previously impractical when a consumer may have dozens or hundreds of isolated shopping carts scattered among vendor websites across the Internet. Exemplary applications include comparison shopping across vendors for the consumer, bidding on the items in the universal shopping basket by vendors (e.g., to propose a better quality or a lower price than those associated with an item picked by the consumer). As another example, cross-vendor gift registries and discount programs may now be available since they may be applied to the cross-vendor shopping cart, the cross-vendor checkout procedure, and the cross-vendor registries at the centrally implemented Multi-Vendor Central System (MV-CS). As a further example, there may be provided a historical order profile feature wherein items that have been purchased earlier are kept in a historical order profile section of the universal shopping cart. Since the items therein have links to the respective page of the vendor product offering page of the respective vendor website, the consumer may not only review a history of items already ordered but may also track back (by clicking on the item listed in the historical profile section, for example) and review the product offering page (and back to the respective vendor) for purposes such as warranty registration, customer service, etc., all from the universal shopping cart.

For the consumer, the need to use only a single universal shopping cart and a single checkout procedure substantially eliminates the confusion associated with the use of different shopping cart interfaces, different checkout interfaces, and different navigation steps when these facilities are implemented in a proprietary fashion by the vendor websites. With one shopping cart interface, one gift registry interface, and one checkout procedure, the consumer has less to learn and become accustomed to, which may open the e-commerce door to many consumers who, up to now, may have been intimidated by the confusing variety of shopping cart interfaces and procedures, checkout interfaces and procedures, and navigation steps that are implemented by each vendor. If there is any edit to the consumer profile, the fact that there is only one centralized place to perform consumer profile edits advantageously simplifies such task for the consumer.

Further, the fact that the consumer profile is kept at a centralized, trusted facility (e.g., the Multi-Vendor Internet Commerce System (MV-ICS)) improves the security of the confidential consumer data. The loss of control over personal, confidential, financial, and/or other data is a fear that has kept many consumers out of e-commerce and if necessary, the invention makes it possible to send only the shipping data and the identification of the items to be shipped to the vendor (i.e., in the case where the Multi-Vendor Internet Commerce System (MV-ICS) service also acts as the merchant of record). In this case, there is no risk of having the personal confidential payment data being kept at multiple vendors since the vendors no longer need the payment data to perform the settlement action.

In one embodiment, the Multi-Vendor Internet Commerce System (MV-ICS) may also contract with the shipping partners (e.g., UPS, the US Post Office, FedEx, etc.) to implement a database and coding system wherein the user's name (and even address) may be made anonymous and known only to the Multi-Vendor Internet Commerce System (MV-ICS) and the shipping partners. The anonymous identity and address (e.g., any unique string or strings of alphanumerics or image or images) may be furnished to the vendor and once the shipped package arrives at the shipping partner, the shipping partner may decipher the anonymous identity (and address, such is also anonymous) to obtain the correct identity and shipping address to facilitate shipping to the purchaser.

It is realized by the inventor(s) herein that the present invention is particularly well suited to the printed catalog industry for use as a vehicle to enable its vendors to sell their merchandise through the Internet with minimal additional investment on the part of the vendors. The tens of thousands of printed catalog vendors currently existing in the United States, for example, are mostly independent of one another, and many are small operations which do not have the resources necessary to implement the necessary proprietary infrastructures to become vendors on the Internet using the prior art paradigm. However, each of these vendors have adapted over time to provide printed catalogs, to have a settlement procedure to receive checks via mail or credit card information from the consumers over the phone or fax, which allow the vendor to charge the consumer for the items purchased, and to have a shipping procedure to ship the purchased item to the consumer using the shipping information provided by the consumers.

The same infrastructures can be readily and inexpensively adapted, using the inventive Multi-Vendor Internet Commerce System (MV-ICS), to allow such vendors to become e-commerce enabled. By way of example, the available printed catalogs can be readily turned into linkable pages using scanners and readily available web-page building tools. If necessary, a web-design service or a hosting firm may be engaged to turn the catalogs from their paper format into an electronic, linkable display, which is viewable by consumers through the Internet. The vendor-site I/O module, which may be a data-driven HTML code, may be pasted or attached to each item or displayable page, and which includes descriptive text/graphics/price of the items to be sold. Again, the invention has reduced the act of linking the selectable items to simply linking the item to be selected to the codes that send the item description to the Multi-Vendor Central System (MV-CS) through the Internet. The vendors may then furnish, using any communication medium, the vendor profile (e.g., contact address, shipping and handling schedules, tax tables, etc.) to the Multi-Vendor Internet Commerce System (MV-ICS). From then on, the MV-ICS handles the interaction with the consumer via its centrally implemented cross-vendor authentication/registration facility, its centrally implemented cross-vendor shopping cart facility, its centrally implemented cross-vendor gift registry, and its centrally implemented cross-vendor checkout procedure. Each vendor may then receive its vendor-specific shipping information (and the payment data, if the vendor acts as the merchant of record which most paper catalog vendors are set up to do) to allow the vendor to charge the consumer for the items bought and to ship the items bought to the consumer.

In fact, it is realized that the invention is also readily adaptable to aggregator sites (such as sites that aggregate catalog databases and implement searching and/or price/feature comparison) to create a whole new business model wherein the aggregator site may act as the Multi-Vendor Internet Commerce System (MV-ICS) provider and provide a cross-vendor clearing house for items displayed, selected, and purchased through the aggregator site using the centrally implemented Multi-Vendor Central System (MV-CS) which the aggregator site implements. Examples of such sites includes portals (e.g., America Online, Yahoo, Excite, Alta Vista, etc.), comparison shopping sites, banks, sites associated with credit card companies (e.g., Visa, Mastercard, American Express, Discover, etc.). In one implementation of this model, many of the databases of electronically viewable merchandise displays may be maintained by the underlying vendors. Once the consumer views the search result provided by the aggregator site and clicks through to the underlying display page(s), the vendor-site I/O modules implemented thereon will allow the Multi-Vendor Central System (MV-CS) to perform its cross-vendor shopping cart, checkout, authentication/registration, and registries functions in the manner discussed earlier.

The above-discussed features, as well as additional features, user-interface, and navigation techniques relevant to some exemplary implementations of the inventive Multi-Vendor Internet Commerce System (MV-ICS) are shown in the series of screenshots submitted herewith as screenshots A1–A46 and B1–B14.

While this invention has been described in terms of several preferred embodiments, there are alterations, permutations, and equivalents which fall within the scope of this invention. Therefore, the above description should be understood to be instructive as to some exemplary implementations and not limiting of the true scope of the present invention.

What is claimed is:

1. A method of implementing a multi-vendor internet commerce system (MV-ICS) for efficiently enabling e-commerce through the Internet for a plurality of vendors and a plurality of consumers, the method comprising:

providing a centrally implemented multi-vendor central processing unit (MV-CPU) that acts as a shared processing location for the plurality of vendors;

providing a centrally implemented multi-vendor shared datastore (MV-SD) that acts cooperatively with the MV-CPU and serves as a shared datastore for the plurality of vendors;

providing one website hosted on at least one server, wherein the website sells products to the consumers from the plurality of vendors, wherein the MV-SD includes at least one database with detailed product descriptions sufficient to make a purchase decision for products from the plurality of vendors, providing a universal shopping cart for a consumer to add items to purchase from different vendors, wherein consumers access said one website to buy products from multiple vendors without leaving the one website to view detailed product information from different vendors and without entering another vendor website to add products from different vendors into the universal shopping cart;

wherein said one website has a checkout process where the consumer submits one order containing products from multiple vendors added to said universal shopping cart, wherein the MV-ICS has logic that takes said one order and communicates information to the vendors about any items in the one order purchased from that vendor, the amount of the purchase, and any shipping information;

wherein, in the checkout process, the consumer submits one order containing products from multiple vendors to the MV-ICS, where the multiple vendors are separate distinct merchants; and displaying to the consumer and submitting by the consumer a single combined order form with separate, distinct invoices showing the name of and subtotals for each of the multiple vendors.

* * * * *